(12) United States Patent
Jo et al.

(10) Patent No.: US 10,823,903 B2
(45) Date of Patent: Nov. 3, 2020

(54) LIGHTING MEMBER USING LIGHT-GUIDING FILM

(71) Applicants: EXA ELECTRONICS CO., LTD., Gyeonggi-do (KR); UTRONIX INC., Gyeonggi-do (KR); EXAOPTONIX INC., Gyeonggi-do (KR)

(72) Inventors: Ho Jun Jo, Busan (KR); Keun Young Yang, Gyeonggi-do (KR); Woo Seok Choi, Gyeonggi-do (KR)

(73) Assignees: EXA ELECTRONICS CO., LTD., Gyeonggi-do (KR); UTRONIX INC., Gyeonggi-do (KR); EXAOPTONIX INC., Gyeonggi-do (KR)

( * ) Notice: Subject to any disclaimer, the term of this patent is extended or adjusted under 35 U.S.C. 154(b) by 14 days.

(21) Appl. No.: 16/334,963

(22) PCT Filed: Mar. 2, 2017

(86) PCT No.: PCT/KR2017/002261
§ 371 (c)(1),
(2) Date: Aug. 23, 2019

(87) PCT Pub. No.: WO2018/056535
PCT Pub. Date: Mar. 29, 2018

(65) Prior Publication Data
US 2019/0377127 A1 Dec. 12, 2019

(30) Foreign Application Priority Data

Sep. 21, 2016 (KR) .......................... 10-2016-0120983

(51) Int. Cl.
*F21V 8/00* (2006.01)
*F21S 41/24* (2018.01)
(Continued)

(52) U.S. Cl.
CPC .......... *G02B 6/0068* (2013.01); *F21S 41/151* (2018.01); *F21S 41/24* (2018.01);
(Continued)

(58) Field of Classification Search
CPC .. G02B 6/0068; G02B 6/0083; G02B 6/0036; F21S 41/151; F21S 43/239; F21S 43/14; F21S 41/24
See application file for complete search history.

(56) References Cited

U.S. PATENT DOCUMENTS

| 6,633,722 B1 | 10/2003 | Kohara et al. |
| 2004/0190307 A1 | 9/2004 | Kitamura et al. |

(Continued)

FOREIGN PATENT DOCUMENTS

| DE | 102010061210 A1 | 6/2012 |
| DE | 102013105261 A1 | 11/2014 |

(Continued)

OTHER PUBLICATIONS

Japanese Patent Abstract (in English) of Japanese Pattent App. Pub. No. JP2000-256633-A, Pub. Date Sep. 22, 2000, downloaded Jul. 1, 2019, from https://worldwide.espacenet.com.

(Continued)

*Primary Examiner* — Joseph L Williams
(74) *Attorney, Agent, or Firm* — Barcelo, Harrison & Walker, LLP

(57) ABSTRACT

Disclosed is a lighting member that can be mounted to a structure having a complicated three-dimensional structure such as an automobile, so as to be used for the purpose of illumination, signaling, decoration, etc., the lighting member including a light-emitting diode and a light-guiding film. A lighting member using a light-guiding film according to an aspect of the present invention is morphologically defined by multiple cut surfaces which are formed by separated from a flexible light-permeable resin film by cutting. The lighting member includes a light-guiding film having a light incident part which is at least one of the multiple cut surfaces and a light-exiting part which faces the light incident part and is at least one of the multiple cut surfaces, the light-exiting part (Continued)

releasing at least a part of the light incident on the light incident part; a plurality of light-emitting diodes arranged at predetermined intervals of distance in proximity to the light incident part so as to make the incidence of light; a mounting substrate having the plurality of light-emitting diodes arranged on a surface thereof and connected to the light-guiding film; and a driving module connected to the mounting substrate so as to electrically drive the plurality of light-emitting diodes.

23 Claims, 29 Drawing Sheets

(51) Int. Cl.
  *F21S 43/239* (2018.01)
  *F21S 43/14* (2018.01)
  *F21S 41/151* (2018.01)
(52) U.S. Cl.
  CPC ............. *F21S 43/14* (2018.01); *F21S 43/239* (2018.01); *G02B 6/0036* (2013.01); *G02B 6/0083* (2013.01)

(56) References Cited

U.S. PATENT DOCUMENTS

| | | | |
|---|---|---|---|
| 2009/0129119 | A1 | 5/2009 | Lee et al. |
| 2010/0085774 | A1 | 4/2010 | Park |
| 2010/0123858 | A1 | 5/2010 | Han et al. |
| 2010/0246200 | A1 | 9/2010 | Tessnow et al. |
| 2011/0026273 | A1 | 2/2011 | Bourdelais et al. |
| 2012/0268966 | A1 | 10/2012 | McCollum et al. |
| 2014/0071703 | A1 | 3/2014 | Motomura |
| 2015/0323730 | A1 | 11/2015 | Lu et al. |
| 2015/0338048 | A1 | 11/2015 | Ahn et al. |
| 2016/0116662 | A1 | 4/2016 | Sato |
| 2017/0002992 | A1 | 1/2017 | Lee |

FOREIGN PATENT DOCUMENTS

| | | | |
|---|---|---|---|
| EP | 2840300 | A1 | 2/2015 |
| EP | 2927572 | A1 | 10/2015 |
| JP | 2000258633 | A | 9/2000 |
| JP | 2005-353599 | A | 12/2005 |
| JP | 2009252695 | A | 10/2009 |
| JP | 2020160000547 | | 10/2009 |
| JP | 2012234846 | A | 11/2012 |
| JP | 2013229153 | A | 11/2013 |
| JP | 2013243162 | A | 12/2013 |
| JP | 5504715 | B2 | 5/2014 |
| JP | 2015102714 | A | 6/2015 |
| KR | 1020140062697 | A | 5/2014 |
| KR | 1020140131897 | A | 11/2014 |
| KR | 1020150138709 | A | 12/2015 |
| KR | 200413480 | Y | 2/2016 |
| KR | 1020160112193 | A | 9/2016 |
| WO | 2010005655 | A2 | 1/2010 |
| WO | 2014087688 | A1 | 6/2014 |

OTHER PUBLICATIONS

Korean Patent Abstract (in English) of Korean Pattent App. Pub. No. KR10-2016-0112193-A, Pub. Date Sep. 28, 2016, downloaded Jul. 1, 2019, from https://worldwide.espacenet.com.
Korean Patent Abstract (in English) of Korean Pattent App. Pub. No. KR10-2014-0131897-A, Pub. Date Nov. 14, 2014, downloaded Jul. 1, 2019, from https://worldwide.espacenet.com.
Korean Patent Abstract (in English) of Korean Utility Model Registration No. KR20-0413480-Y, Reg. Date Apr. 3, 2006.
Korean Patent Abstract (in English) of Korean Utility Model Publication No. KR20-2016-0000547, Pub. Date Feb. 16, 2016.
Japanese Patent Abstract (in English) of Japanese Pattent App. Pub. No. JP2009-252695-A, Pub. Date Oct. 29, 2009, downloaded Jul. 1, 2019, from https://worldwide.espacenet.com.
Japanese Patent Abstract (in English) of Japanese Pattent App. Pub. No. JP2013-243162-A, Pub. Date Dec. 5, 2013, downloaded Jul. 1, 2019, from https://worldwide.espacenet.com.
Japanese Patent Abstract (in English) of Japanese Pattent App. Pub. No. JP5504715-B2, Pub. Date May 28, 2014, downloaded Jul. 1, 2019, from https://worldwide.espacenet.com.
Patent Abstract (in English) of WIPO Patent App. Pub. No. WO2010-005655-A2, Pub. Date Jan. 14, 2010, downloaded Jul. 8, 2019, from https://worldwide.espacenet.com.
Japanese Patent Abstract (in English) of Japanese Pattent App. Pub. No. JP2012-234846-A, Pub. Date Nov. 29, 2012, downloaded Jul. 1, 2019, from https://worldwide.espacenet.com.
Japanese Patent Abstract (in English) of Japanese Pattent App. Pub. No. JP2013-229153-A, Pub. Date Nov. 7, 2013, downloaded Jul. 1, 2019, from https://worldwide.espacenet.com.
Patent Abstract (in English) of WIPO Patent App. Pub. No. WO2014-087688-A1, Pub. Date Jun. 12, 2014, downloaded Jul. 8, 2019, from https://worldwide.espacenet.com.
Japanese Patent Abstract (in English) of Japanese Pattent App. Pub. No. JP2015-102714-A, Pub. Date Jun. 4, 2015, downloaded Jul. 1, 2019, from https://worldwide.espacenet.com.
Korean Patent Abstract (in English) of Korean Pattent App. Pub. No. KR10-2014-0062697-A, Pub. Date May 26, 2014, downloaded Jul. 1, 2019, from https://worldwide.espacenet.com.
Korean Patent Abstract (in English) of Korean Pattent App. Pub. No. KR10-2015-0138709-A, Pub. Date Dec. 10, 2015, downloaded Jul. 1, 2019, from https://worldwide.espacenet.com.
Office Action (in Korean) for KR Patent Application No. KR10-2017-0027175 dated Aug. 7, 2017.
Notice of Allowance (in Korean) for KR Patent Application No. KR10-2017-0027175, dated Dec. 18, 2017.
Notice of Allowance (in Korean) for KR Patent Application No. KR10-2017-0120179, dated Mar. 28, 2018.
Office Action (in Korean) for KR Patent Application No. KR10-2017-0122031, dated Sep. 17, 2018.
Japanese Patent Abstract (in English) of JP Patent App. Pub. No. 2005-353599 A, Pub. Date Dec. 22, 2005, downloaded Mar. 18, 2019 from https://www4.j-platpat.inpit.go.jp/eng/.
International Search Report of Int. App. No. PCT/KR2017/002261 dated on Jun. 19, 2017 from KIPO.
German Patent Abstract (in English) of German Patent App. Pub. No. DE 10 2010 061 210 (A1), Pub. Date Jun. 14, 2012, downloaded Jul. 14, 2020, from https://worldwide.espacenet.com.
European Patent Abstract (in German) of European Patent App. Pub. No. EP 2 927 572 (A1), Pub. Date Oct. 7, 2015, downloaded Jul. 14, 2020, from https://worldwide.espacenet.com.
European Patent Abstract (in English) of European Patent App. Pub. No. EP 2 840 300 (A1), Pub. Date Feb. 25, 2015, downloaded Jul. 14, 2020, from https://worldwide.espacenet.com.
German Patent Abstract (in German) of German Patent App. Pub. No. DE 10 2013 105 261 (A1), Pub. Date Nov. 27, 2014, downloaded Jul. 14, 2020, from https://worldwide.espacenet.com.
Search Report, for European Patent Application No. 17853249.5, dated May 4, 2020.

(a)

(b)

(a)

(b)

(c)

LIGHTING MEMBER USING LIGHT-GUIDING FILM

CROSS-REFERENCE TO RELATED APPLICATIONS

This application is the national stage entry for International Patent Cooperation Treaty Application PCT/KR2017/002261, filed on 2 Mar. 2017, which claims priority from Korean Patent Application No. 10-2016-0120983, filed on 21 Sep. 2016, in the Korean Intellectual Property Office. The entire contents of said applications are incorporated herein by reference for all purposes.

BACKGROUND OF THE INVENTION

Technical Field

The present invention relates to a lighting member using a light-guiding film, and more particularly, to a lighting member that is mounted on a complicated three-dimensional structure such as a vehicle so as to be used for the purpose of lighting, signaling, decoration, or the like and includes a light-emitting diode and a light-guiding film.

Background Art

Various types of lamp assemblies are used inside and outside a vehicle. In general, a lamp assembly for a vehicle has a lighting function for assisting a driver in recognizing an object with the naked eye at night or in bad weather where there is a lack of natural light, and the lamp assembly has a signaling function for indicating a state of the vehicle to the outside. For example, headlamps or fog lamp mainly serve to provide lighting, and turn signal lamps, tail lamps, and brake lamps mainly serve to provide signals. In addition, various lamp assemblies are installed inside/outside the vehicle and used to indicate a position of a particular manipulating device or used for the purpose of decoration or indication of a state of the vehicle.

In comparison with light sources in the related art, a light-emitting diode (LED) has lots of advantages in that the light-emitting diode does not use harmful substances such as mercury and thus causes less environmental pollution, and the light-emitting diode has a long lifespan, low electric power consumption, and excellent visibility, and causes less light blindness. Recently, the LEDs are widely used for lighting devices for vehicles in accordance with rapid developments of technologies associated with the LEDs such as high-brightness light-emitting diodes.

For example, Korean Patent Application Laid-Open No. 2014-0131897 discloses a point-light-emitting type auxiliary brake lamp 3 for a vehicle 1 that uses LEDs as illustrated in FIGS. 1a and 1b, in which multiple LEDs 4 are disposed to be spaced apart from one another or disposed in groups so as to ensure a lighting width of the auxiliary brake lamp which is a predetermined standard or higher determined by the related regulations.

However, in this related art, the amount of light very greatly varies depending on positions on surfaces of the LEDs on the brake lamp because the arrangement positions of the multiple LEDs directly affect a light emitting pattern of the brake lamp which is recognized from the outside. For this reason, only particular points, where the respective LEDs are positioned, are conspicuously and visually recognized in the form of local point light sources when viewing the brake lamp from the rear side, but linear light sources or surface light sources, which have entirely uniform light emitting patterns, cannot be implemented. If arrangement intervals are decreased by increasing the number of LEDs to avoid the above-mentioned problems, there is a problem in that component costs increase. There is also a problem in that the component costs, the number of components, and an overall module thickness also increase even if a diffusion plate or the like is disposed on the surface.

FIGS. 2a and 2b are views illustrating vertically light-emitting type lighting devices for vehicles which use plate-shaped light guide plates according to another related art. Korean Utility Model Registration No. 20-0413480 discloses a lighting device for a vehicle which may be applied to a headlamp, a tail lamp, a brake lamp, or the like and includes a housing 5, a side reflective plate 8, a light guide plate 9, a high-brightness red LED module 10, a high-brightness white LED module 11, and a high-brightness amber LED module 12, as illustrated in FIG. 2.

In the related art, the LED modules 10, 11, and 12 are disposed on a side surface of the light guide plate 9, and light, which is incident on a side portion of the light guide plate 9 from the LED modules 10, 11, and 12, is guided toward a light emergent part in a direction perpendicular to the side portion (a planar direction in the drawings), such that various scattering patterns 6 are formed on the light emergent part, thereby exhibiting visibility and decoration effects. However, the above-mentioned structure is not intended to implement linear light sources or surface light sources having a uniform light emitting pattern, and the above-mentioned structure uses the light guide plate 9 having a constant thickness and a three-dimensional structure. The light guide plate 9 has a complicated structure and is inevitably manufactured depending on an injection molding process, which causes an increase in manufacturing costs. There is a fundamental limitation in that it is impossible to implement a linear light source or a surface light source having a smaller thickness because an implementable thickness of the structure is limited (it is generally difficult to implement a structure having a thickness of approximately 4 mm or less) when the injection molding process is used.

There are cases in which the LEDs and the light guide plates are applied to implement the lighting devices for vehicles even in the related art as described above. However, in general, it is impossible to find a case in which a lighting member is proposed, which is mounted inside/outside a vehicle having a complicated three-dimensional structure to implement a linear light source having a thinner and uniform light emitting pattern, is inexpensive in manufacturing costs because there is no need for an injection molding process or the like, is easily modified and then applied even though the design of the vehicle is changed, and thus is made by considering versatility as a vehicle component.

In addition, with the development of vehicle culture, various types of vehicles have been launched, and technologies have been leveled up to implement essential functions related to vehicle traveling. Therefore, in order to ensure competitiveness in the market, design factors or emotional factors also tend to be emphasized in addition to functional factors, and the lighting device for a vehicle is a very important factor for expressing personality or characteristics of the vehicle. There is an acute need to ensure basic material/component infrastructures that support more various designs and enable the designs to be applied by utilizing individual lighting devices for vehicles or the entire appropriate combinations thereof without causing concern about component costs and component complexity to vehicle manufacturers.

DISCLOSURE

Technical Problem

The present invention has been made in an effort to solve the above-mentioned problems in the related art, and an object of the present invention is to provide a lighting member including a light-emitting diode and a light-guiding film which is easily applied to an inside/outside structure of a vehicle having a complicated three-dimensional structure and may implement an ideal linear light source having a thinner and uniform light emitting pattern.

In addition, another object of the present invention is to provide a lighting member including a light-emitting diode and a light-guiding film which is very inexpensive in manufacturing costs because the lighting member may be manufactured without using an injection molding process, the lighting member may be easily applied without worry in view of component costs and component complexity even though designs of vehicles are changed by vehicle manufacturers or new vehicle designs are made, and has improved versatility as a vehicle component.

In addition, still another object of the present invention is to provide a basic material/component infrastructure capable of being utilized to easily implement various high-grade designs for vehicle manufacturers by supplying lighting members which are light in weight, modularized, and have flexibility.

In addition, yet another object of the present invention is to provide a lighting member which has flexibility so as to be easily manufactured in various forms, provides an ideal linear light source having a uniform light emitting pattern to be utilized in appropriate places to produce a high-grade vehicle interior/exterior, and emits soft and gentle light to improve decoration and produce various atmospheres in addition to a function of lighting the vehicle interior.

Technical Solution

A lighting member using a light-guiding film according to one aspect of the present invention includes: the light-guiding film which has a shape defined by multiple cut surfaces formed by being cut and separated from a flexible light transmissive resin film, the light-guiding film having a light incident part that is at least one of the multiple cut surfaces, and a light emergent part that is at least another one of the multiple cut surfaces and faces the light incident part, and at least a part of light incident on the light incident part being emergent from the light emergent part; multiple light-emitting diodes which are arranged at predetermined intervals in the vicinity of the light incident part so as to allow light to be incident on the light incident part; a mount board which is connected to the light-guiding film and has a surface on which the multiple light-emitting diodes are disposed; and a driving module which is connected to the mount board to electrically operate the multiple light-emitting diodes.

Here, the light-guiding film may have a thickness of 0.1 mm to 2.0 mm.

In addition, a length from the light incident part to the light emergent part of the light-guiding film may be 8 mm to 250 mm.

In addition, the light incident part may face the multiple light-emitting diodes, and the light emergent part may be positioned at a side opposite to a side that constitutes the light incident part on the plane of the light-guiding film.

In addition, the light-guiding film may be cut to have a band shape, or at least any one of the light emergent part and the light incident part may be cut to constitute a curved side on the plane of the light-guiding film.

In addition, concave-convex portions may be formed on a surface of the light emergent part to mitigate non-uniformity of a light emitting pattern on the light emergent part which is caused as the multiple light-emitting diodes are disposed to be spaced apart from one another.

In addition, concave-convex portions having one or two or more shapes may be repeatedly disposed at predetermined intervals on a surface of the light emergent part.

In addition, the lighting member using the light-guiding film according to the present invention may further include one or more coupling layers attached to one or both of upper and lower surfaces of the light-guiding film.

A lighting member using a light-guiding film according to another aspect of the present invention includes: the light-guiding film which has a light incident part that is at least one of multiple side surfaces, and a light emergent part that is at least another one of the multiple side surfaces and faces the light incident part, at least a part of light incident on the light incident part being released from the light emergent part; multiple light-emitting diodes which are arranged at predetermined intervals in the vicinity of the light incident part so as to allow light to be incident on the light incident part; a mount board which is connected to the light-guiding film and has a surface on which the multiple light-emitting diodes are disposed; and a driving module which is connected to the mount board to electrically operate the multiple light-emitting diodes, in which concave-convex portions are formed on a surface of the light emergent part to mitigate non-uniformity of a light emitting pattern on the light emergent part in a direction parallel to the light-guiding film which is caused as the multiple light-emitting diodes are disposed to be spaced apart from one another.

Here, a thickness of the light-guiding film at the light emergent part and a thickness of the light-guiding film at the light incident part may be different from each other.

In addition, a cross section of the light-guiding film may include a tapered shape such that the thickness at the light emergent part is larger than the thickness at the light incident part.

A lighting member using a light-guiding film according to still another aspect of the present invention includes: the light-guiding film which has a shape defined by multiple cut surfaces formed by being cut and separated from a flexible light transmissive resin film, the light-guiding film having a light incident part that is at least one of the multiple cut surfaces, a light reflective part that is at least another one of the multiple cut surfaces and reflects light incident from the light incident part, and a light emergent part that is at least still another one of the multiple cut surfaces and faces the light incident part, at least a part of light incident on the light incident part and at least a part of light reflected from the light reflective part being released from the light emergent part; one or more light-emitting diodes which are aligned at predetermined intervals in the vicinity of the light incident part so as to allow light to be incident on the light incident part; a mount board which is connected to the light-guiding film and has a surface on which the one or more light-emitting diodes are disposed; and a driving module which is connected to the mount board to electrically operate the one or more light-emitting diodes.

A method of manufacturing a lighting member using a light-guiding film according to yet another aspect of the present invention includes: forming the light-guiding film which has a shape defined by multiple cut surfaces formed by being cut and separated from a flexible light transmissive resin film, the light-guiding film having a light incident part that is at least one of the multiple cut surfaces, and a light emergent part that is at least another one of the multiple cut surfaces and faces the light incident part, and at least a part of light incident on the light incident part being emergent from the light emergent part; aligning multiple light-emitting diodes at predetermined intervals on a mount board in the vicinity of the light incident part so as to allow light to be incident on the light incident part; and coupling the light-guiding film to the mount board which has a surface on which the multiple light-emitting diodes are disposed and to the driving module which electrically operates the multiple light-emitting diodes.

A method of manufacturing a lighting member using a light-guiding film according to still yet another aspect of the present invention includes: forming the light-guiding film which has a light incident part that is at least one of multiple side surfaces, and a light emergent part that is at least another one of the multiple side surfaces and faces the light incident part, at least a part of light incident on the light incident part being released from the light emergent part; aligning multiple light-emitting diodes at predetermined intervals on a mount board in the vicinity of the light incident part so as to allow light to be incident on the light incident part; and coupling the light-guiding film to the mount board which has a surface on which the multiple light-emitting diodes are disposed and to the driving module which electrically operates the multiple light-emitting diodes, in which concave-convex portions are formed on a surface of the light emergent part to mitigate non-uniformity of a light emitting pattern on the light emergent part in a direction parallel to the light-guiding film which is caused as the multiple light-emitting diodes are disposed to be spaced apart from one another.

A method of manufacturing a lighting member using a light-guiding film according to a further aspect of the present invention includes: forming the light-guiding film which has a shape defined by multiple cut surfaces formed by being cut and separated from a flexible light transmissive resin film, the light-guiding film having a light incident part that is at least one of the multiple cut surfaces, a light reflective part that is at least another one of the multiple cut surfaces and reflects light incident from the light incident part, and a light emergent part that is at least still another one of the multiple cut surfaces and faces the light incident part, at least a part of light incident on the light incident part and at least a part of light reflected from the light reflective part being released from the light emergent part; disposing one or more light-emitting diodes at predetermined positions in the vicinity of the light incident part so as to allow light to be incident on the light incident part; and coupling the light-guiding film to the mount board which has a surface on which the one or more light-emitting diodes are disposed and to a driving module which electrically operates the one or more light-emitting diodes.

Advantageous Effects

According to the present invention, it is possible to provide the lighting member including the light-emitting diode and the light-guiding film which is easily applied to the inside/outside structure of the vehicle having the complicated three-dimensional structure and may implement the ideal linear light source having the thinner and uniform light emitting pattern.

In addition, according to the present invention, it is possible to provide the lighting member including the light-emitting diode and the light-guiding film which is very inexpensive in manufacturing costs because the lighting member may be manufactured without using an injection molding process, the lighting member may be easily applied without worry in view of component costs and component complexity even though designs of vehicles are changed by vehicle manufacturers or new vehicle designs are made, and has improved versatility as a vehicle component.

In addition, according to the present invention, it is possible to provide the basic material/component infrastructure capable of being utilized to easily implement various high-grade designs for vehicle manufacturers by supplying the lighting members which are light in weight, modularized, and have flexibility.

In addition, according to the present invention, it is possible to provide the lighting member which has flexibility so as to be easily manufactured in various forms, provide the ideal linear light source having the uniform light emitting pattern to be utilized in appropriate places to produce a high-grade vehicle interior/exterior, and emit soft and gentle light to improve decoration and produce various atmospheres in addition to the function of lighting the vehicle interior.

DETAILED DESCRIPTION

Best Mode

Figure 1A:
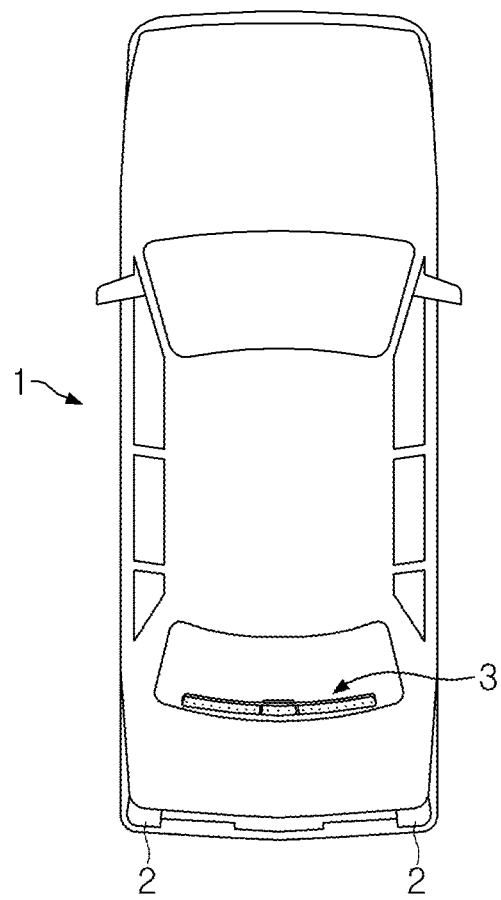
FIGS. 1a and 1b are views illustrating a point light-emitting type auxiliary brake lamp using LEDs in the related art.
Figure 1B:
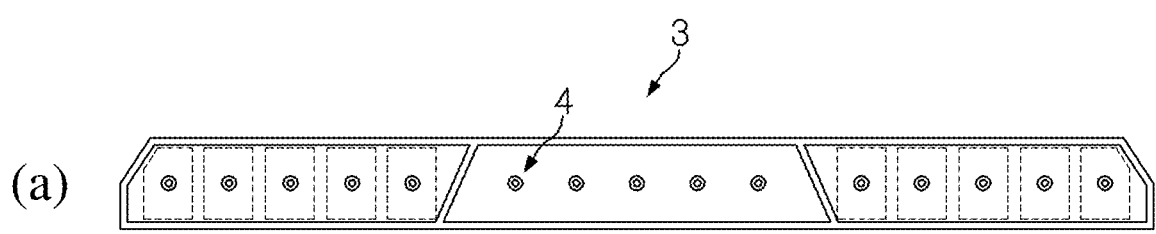
Figure 1B:
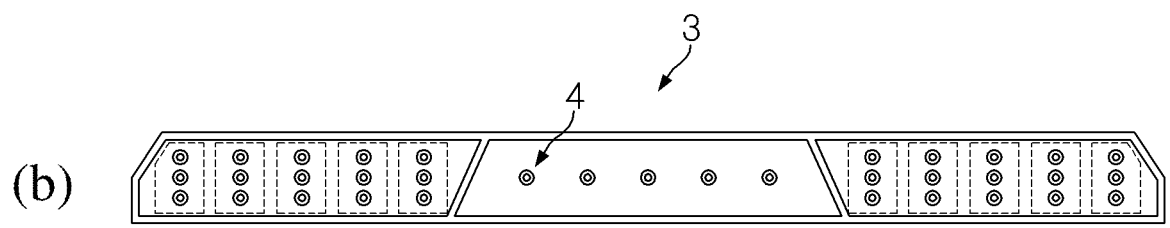

It should be noted that technical terms used in the present intention are used to just describe a specific exemplary embodiment and do not intend to limit the scope of the present invention. Further, unless the technical terms used in the present invention are particularly defined as other meanings in the present invention, the technical terms should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plural expressions unless clearly described as different meanings in the context. It should not be interpreted that the terms "comprises," "comprising," "includes" and/or "including," used herein necessarily include all of the several constituent elements or several steps disclosed in the present invention, and it should be interpreted that the terms do not include some of the constituent elements or steps and may further include additional constituent elements or steps.

The terms including ordinal numbers such as "first" and "second" used in the present invention may be used to describe constituent elements, but the constituent elements should not be limited by the terms. These terms are used only to distinguish one constituent element from another constituent element. For example, a first constituent element may be named a second constituent element, and similarly, the second constituent element may also be named the first constituent element, without departing from the scope of the present invention.

Hereinafter, the exemplary embodiments according to the present invention will be described in detail with reference to the accompanying drawings. The same or corresponding constituent elements are assigned with the same reference numerals regardless of reference numerals, and the repetitive description thereof will be omitted.

In addition, in the description of the present invention, the specific descriptions of publicly known related technologies will be omitted when it is determined that the specific descriptions may obscure the subject matter of the present invention. In addition, it should be noted that the accompanying drawings are provided only to allow those skilled in the art to easily understand the technical spirit of the present invention, and the technical spirit of the present invention should not be interpreted as being limited by the accompanying drawings.

Figure 3A:
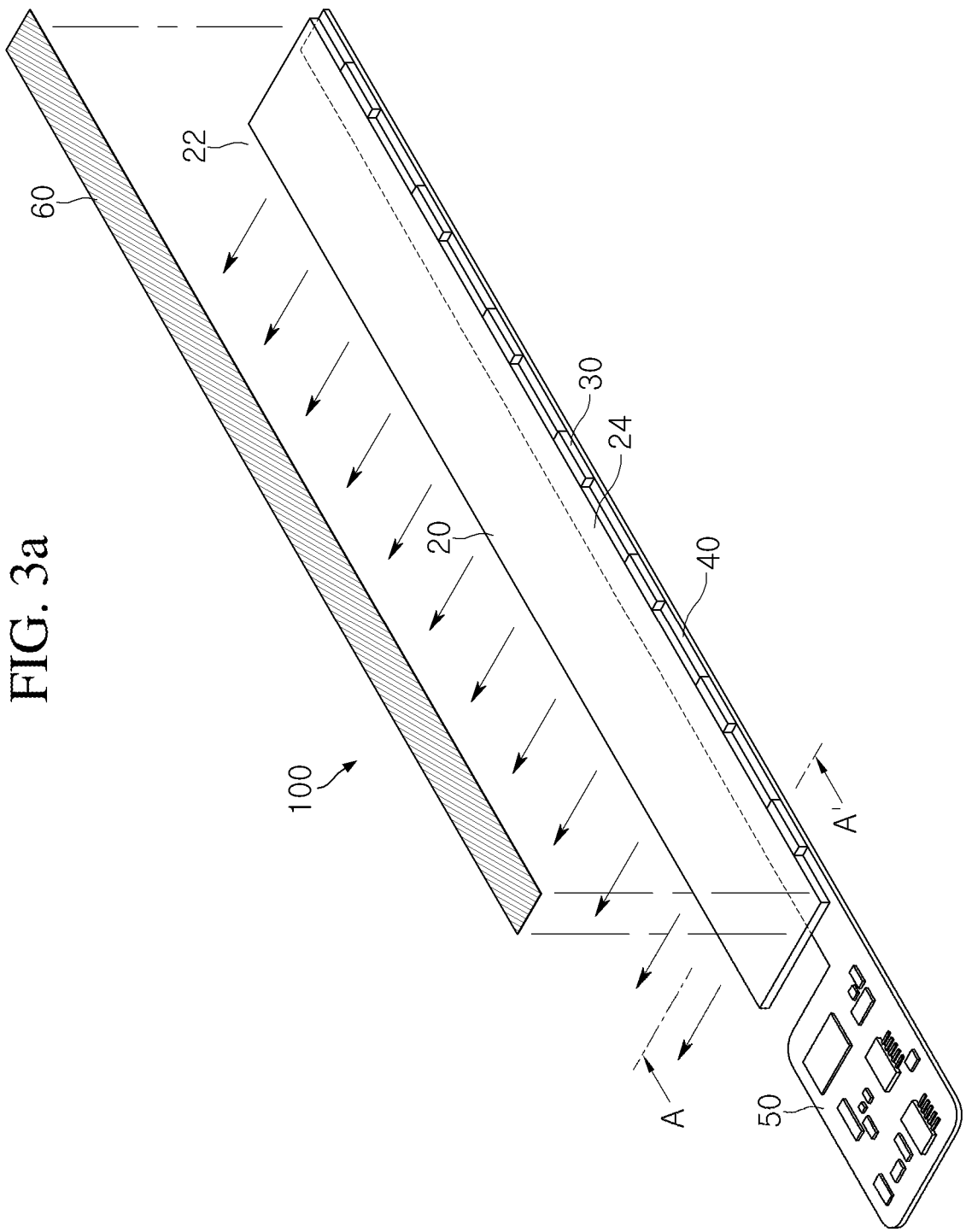
FIGS. 3a-3e are views for explaining a lighting member using a light-guiding film according to an exemplary embodiment of the present invention.
Figure 3B:
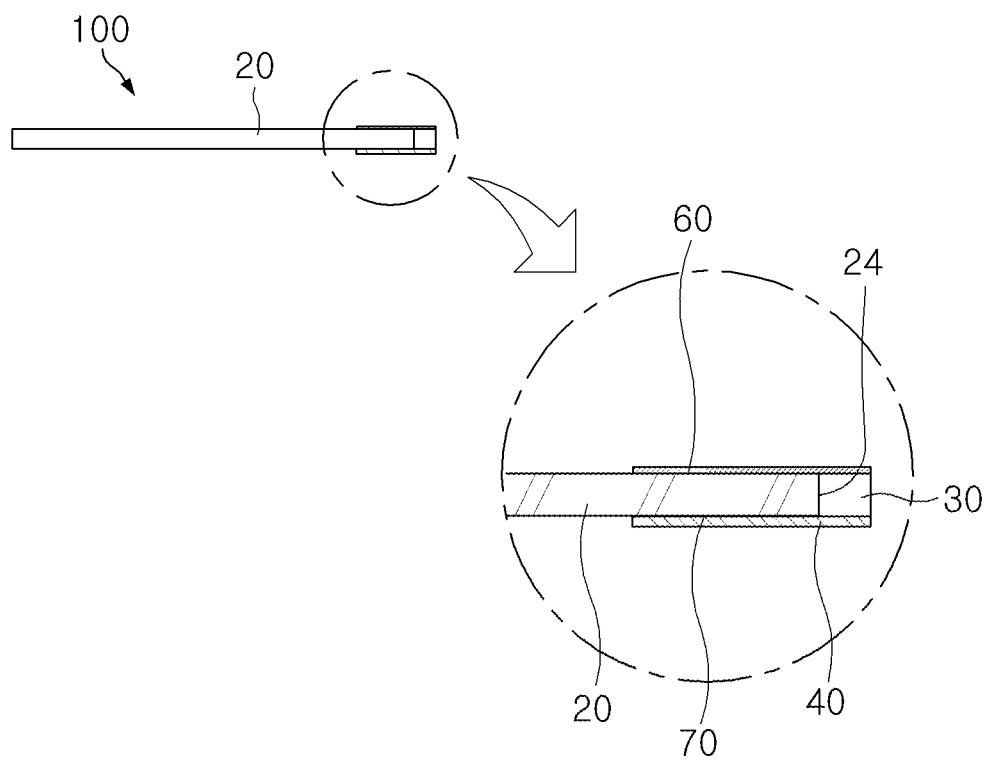
Figure 3C:
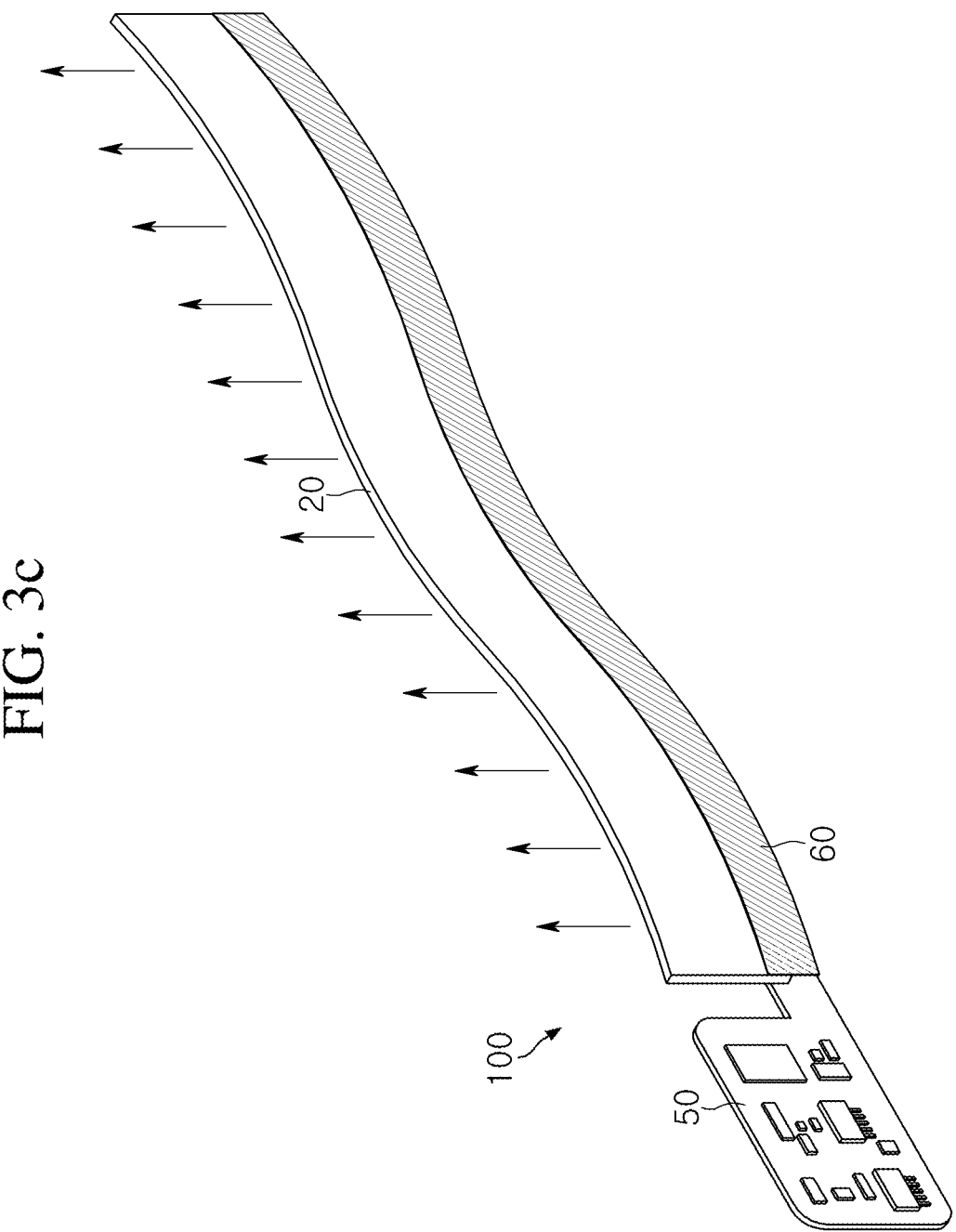
Figure 3D:
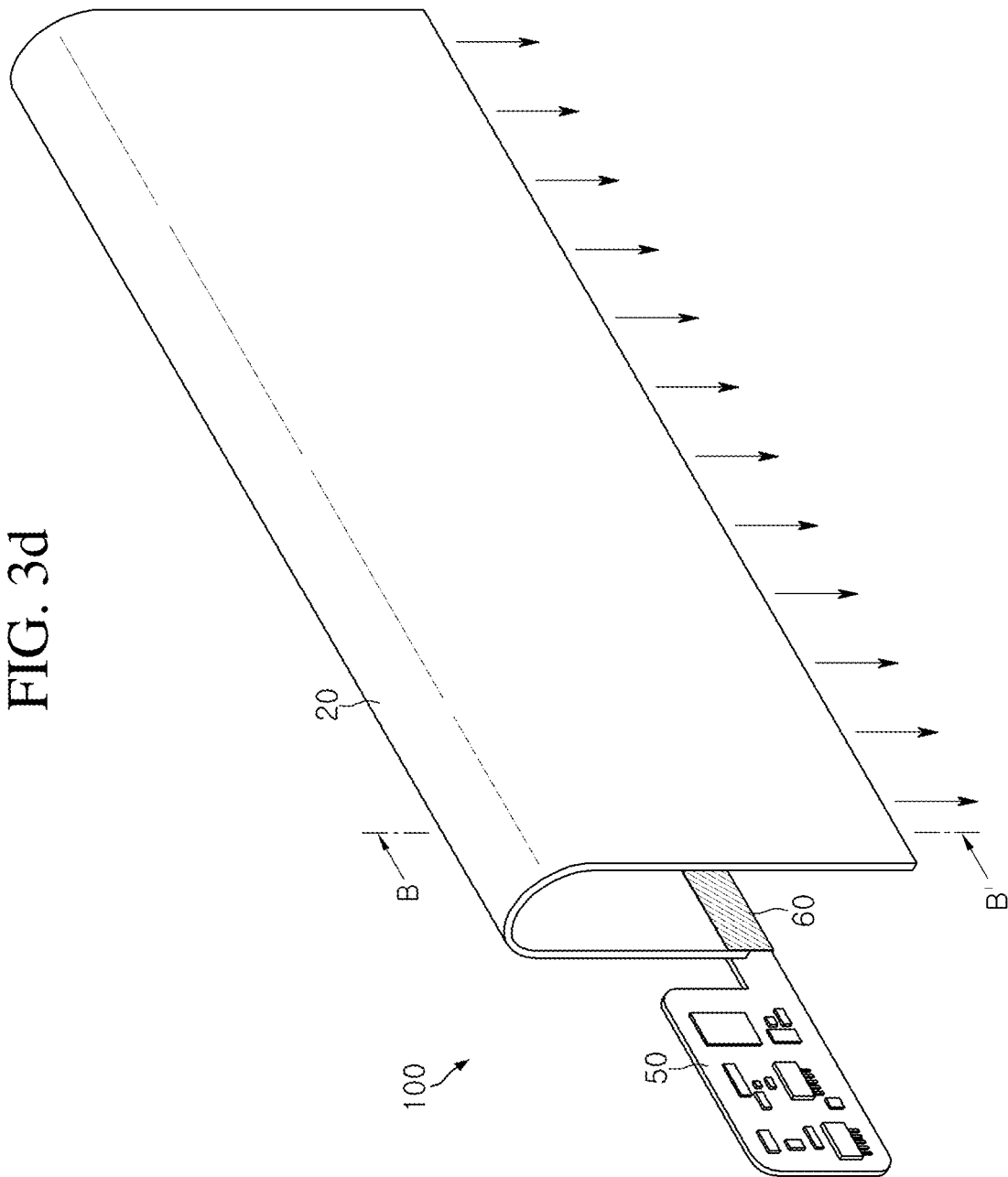
Figure 3E:
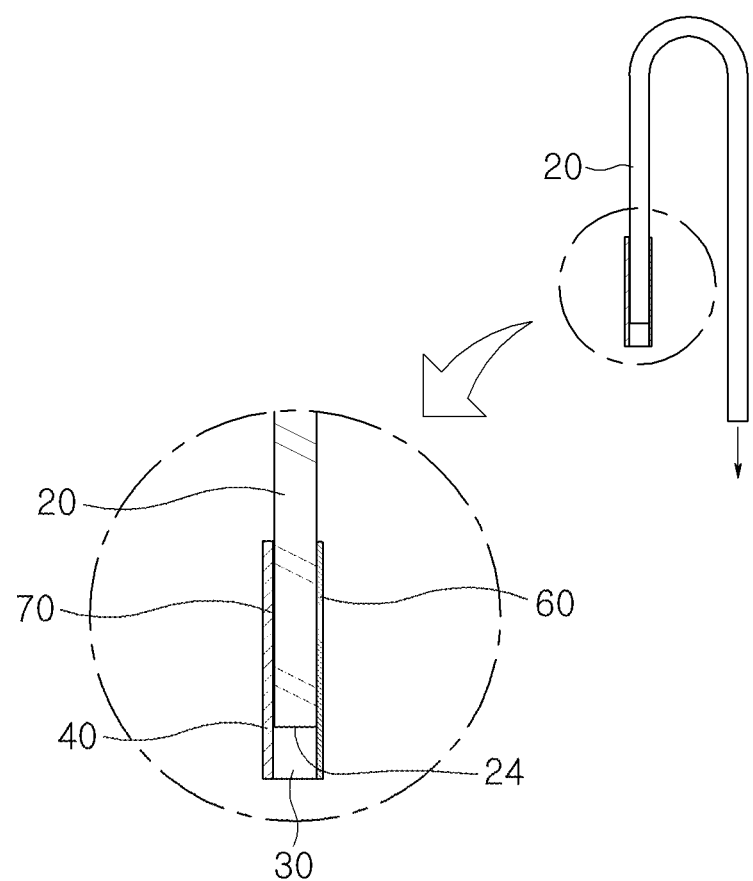

FIGS. 3a-3e are views for explaining a lighting member 100 using a light-guiding film according to an exemplary embodiment of the present invention. FIG. 3a is a schematic view for explaining an entire configuration of the lighting member 100 according to the exemplary embodiment, and FIG. 3b is a schematic view illustrating a cross section (e.g., taken along line A-A') of the lighting member 100 in FIG. 3a. In addition, FIGS. 3c-3e illustrate examples in which the lighting member 100 according to the exemplary embodiment is appropriately utilized for a three-dimensional structure such as an interior/exterior of a vehicle by utilizing flexibility of the lighting member 100.

The lighting member 100 according to the exemplary embodiment includes a light-guiding film 20, multiple light-emitting diodes 30, a mount board 40, and a driving module 50.

Here, the light-guiding film 20 may be formed by being cut and separated from a flexible light transmissive resin film. The light transmissive resin film may be made of acrylic-based resin (PMMA) which has high transmittance in a wavelength region of visible light, or polycarbonate (PC) which also has high transmittance and excellent mechanical strength. In particular, polycarbonate (PC), which may ensure durability even though the light-guiding film 20 is thin, is more preferable in a case in which the light-guiding film 20 is used in the form of a film as described in the present invention.

A thickness of the light transmissive resin film ranges preferably from 0.1 mm to 3.0 mm, and more preferably, the thickness may range from 0.1 mm to 2.0 mm to maintain mechanical durability and ensure high flexibility. The light transmissive resin film within these ranges may be easily available on the market because the light transmissive resin film may be easily mass-produced by a method such as rolling without using an expensive process such as injection molding, and as a result, it is possible to greatly reduce manufacturing costs of the lighting member 100.

The light-guiding films 20, which have high flexibility and various shapes and thicknesses as illustrated in FIGS. 3c-3e, may be obtained by cutting the light transmissive resin film into an appropriate shape.

Figure 4:
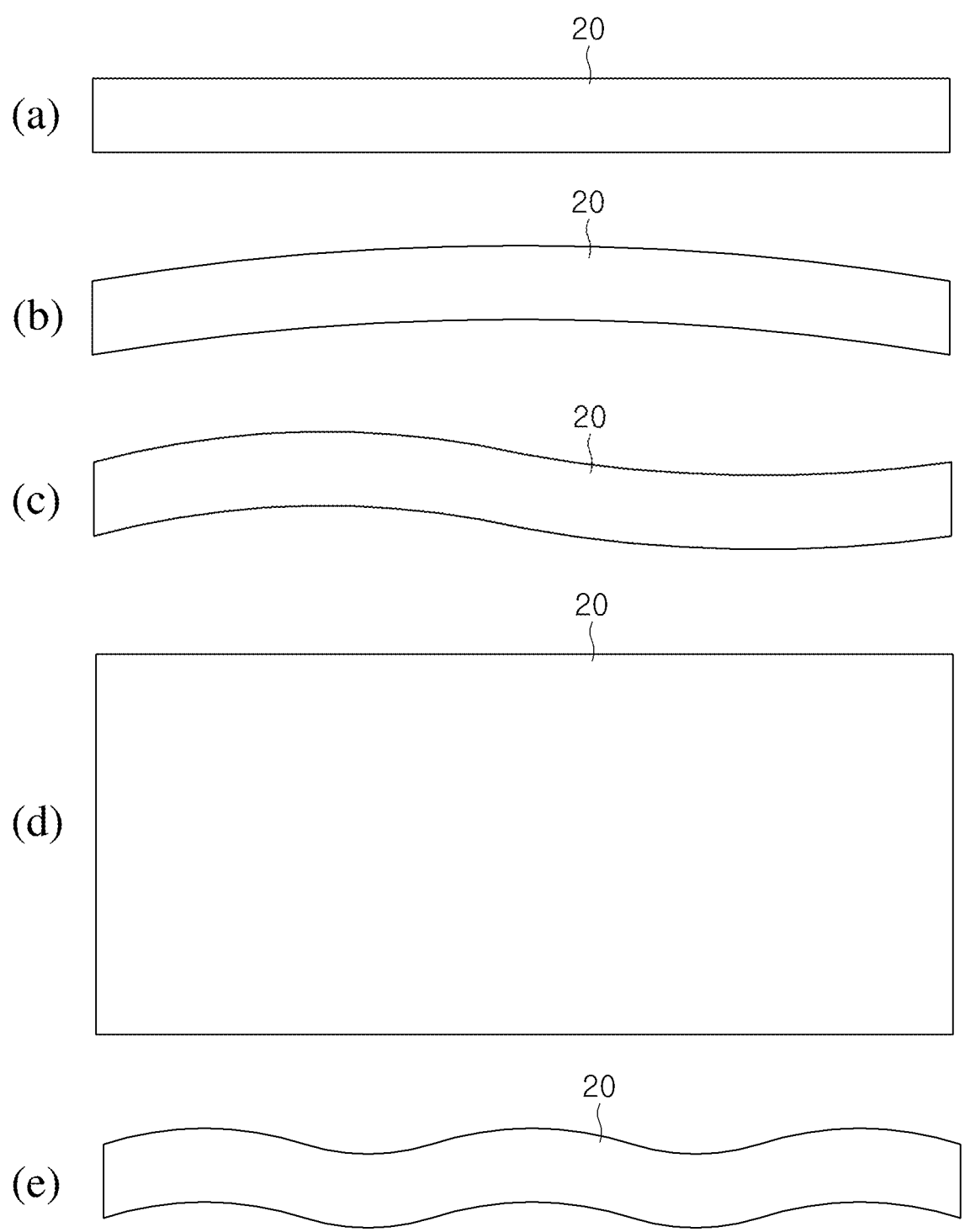
FIG. 4 shows views illustrating various examples of a planar shape of the light-guiding film according to the present invention.

FIG. 4 illustrates various examples of a planar shape of the light-guiding film 20 according to the present invention. As illustrated in FIG. 4, the light-guiding film 20 may be cut in various shapes to have an entirely straight or curved shape or may be cut in more complicated shapes other than the illustrated shapes and then be easily processed to be suitable for an interior/exterior structure of the vehicle that generally has a complicated three-dimensional structure. In this case, there is an advantage in that mass-production suitability is excellent because no expensive process such as an injection molding process is required. Further, it is possible to allow vehicle designers to broaden a range of lighting designs inside/outside the vehicle in consideration of various decorative effects and visibility.

Furthermore, only a plate-shaped structure having a predetermined minimum thickness of 3 to 4 mm or more may be manufactured through the injection molding process, and there is a limitation in that the injection molding process cannot manufacture a structure in the form of a thin film. Therefore, with the use of the light-guiding film 20 obtained by cutting the light transmissive resin film into an appropriate shape as described in the present invention, it is possible to overcome the limitation of the injection molding process and thus to implement an ultra-slim linear light source with maximized visibility and decorative effects.

As illustrated in FIG. 4, the shape of the light-guiding film 20 is defined by multiple cut surfaces or edges formed by being cut and separated from the light transmissive resin film. At least one of the multiple cut surfaces of the light-guiding film 20 may be used as a light emergent part 22 as illustrated in FIG. 3a, and at least another one of the multiple cut surfaces may be used as a light incident part 24.

As illustrated in FIG. 3a, the multiple light-emitting diodes 30 are arranged at predetermined intervals on the mount board 40 in the vicinity of the light incident part 24 so as to allow light to be incident on the light-guiding film 20. Therefore, light, which is emergent from the multiple light-emitting diodes 30, is incident on the light incident part 24 adjacent to and facing the multiple light-emitting diodes 30, and then released to the light emergent part 22 through the light-guiding film 20. Therefore, the light emergent part 22 is positioned at a side approximately opposite to a side that constitutes the light incident part 24 on the plane of the light-guiding film 20, and the light emergent part 22 allows the light incident on the light-guiding film 20 to be emergent from the light emergent part 22.

In addition, the mount board 40, which has the surface on which the multiple light-emitting diodes 30 are disposed, may be implemented as a flexible printed circuit board (PCB) having flexibility. In general, the mount board 40 is a circuit board that may be curved or bent and may be manufactured by forming a conductor circuit pattern having conductivity on an electrical insulator having flexibility.

The mount board 40 is configured to provide a portion on which the multiple light-emitting diodes 30 are mounted and connected. According to the present invention, because extremely high mounting density is not required and the mount board 40 is easily manufactured, an inexpensive single-sided PCB may also be applied as the mount board 40. However, as necessary, it is possible to employ a double-sided PCB which is a PCB that has upper and lower surfaces on which circuits are formed and enables components to be mounted with high density in comparison with the single-sided PCB. Alternatively, it is possible to employ a multilayer PCB which is a PCB that has a three-dimensional structure and an inner layer circuit and an outer layer circuit, enables components to be mounted with high density, and may reduce a line distance by means of three-dimensional wiring. In addition, it is possible to employ a rigid-flex (RF) PCB in which a pliable PCB portion having bendability is integrated with and electrically connected to a hard portion in order to maximize utilization of a limited space for a device and to improve connection reliability in a case in which several boards need to be connected to one another in accordance with high performances and miniaturization of electronic devices.

In addition, in some instances, the mount board 40 may be implemented by using an more inexpensive PCB made of a material such as FR4 in a case in which only a thin linear light source needs to be implemented without requiring flexibility or flexibility of the light-guiding film 20 is sufficient as it is.

In addition, the lighting member 100 using the light-guiding film 20 according to the present invention includes the driving module 50 which is connected to the mount board 40 and electrically operates the multiple light-emitting diodes 30. The driving module 50 may be initially connected to the mount board 40 by being integrated with the mount board 40, or the driving module 50 and the mount board 40 may be separately manufactured and then coupled and connected to each other. Likewise, the driving module 50 may be made of the same board material as the mount board 40 or may be made of a board material different from a board material of the mount board 40.

As illustrated in FIGS. 3a and 3b, the lighting member 100 according to the present invention may further include coupling layers 60 and 70 attached to one or both of upper and lower surfaces of the light-guiding film 20. The coupling layers 60 and 70 may be implemented as appropriate members such as a tape having a bonding agent applied onto one or both of the upper and lower surfaces thereof, or other injection-molded resin products. As necessary, a material capable of ensuring flexibility like the light-guiding film 20 may be used, and the material may also perform a light blocking function to prevent the light released from the lighting light-emitting diode 30 from leaking to the outside. However, because the lighting member 100 according to the present invention is coupled to other components outside the lighting member 100 when the lighting member 100 is assembled to a structure such as a vehicle, a component, such as an injection-molded product, configured to couple the light-guiding film 20 may be configured to serve to couple the light-guiding film 20 and the mount board 40 instead of the coupling layers 60 and 70.

In addition, the lighting member 100 according to the present invention may further include a reflective layer (not illustrated) formed on or disposed adjacent to one or both of the upper and lower surfaces of the light-guiding film 20. Theoretically, the light, which is incident within a total reflection angle through the light incident part 24 from the side of the light-guiding film 20, reaches the light emergent part 22 without leaking. However, a part of the light may leak and the amount of leaking light may vary depending on surface roughness of the upper and lower surfaces of the light-guiding film 20 or on the presence or absence of the fine defects. Therefore, the reflective layer may be formed on the upper or lower surface of the light-guiding film 20 as necessary to prevent a leakage of light and improve light transmission efficiency. However, because the lighting member 100 according to the present invention may be coupled to other components outside the lighting member 100 in a case in which the lighting member 100 is assembled to a structure such as a vehicle, a reflective layer may be formed on or a white color having high light reflectance may be applied to a surface of a component such as an injection-molded product to be coupled to the light-guiding film 20, such that the component may be configured to perform a function of a reflective layer that improves light transmission efficiency.

In addition, FIGS. 3c-3e illustrate examples in which the lighting member 100 according to the exemplary embodiment is appropriately utilized for a three-dimensional structure such as an interior/exterior of a vehicle by utilizing flexibility of the lighting member 100. FIG. 3c illustrates an example in which the lighting member 100 having a band shape is curved in a horizontal direction and then applied, and FIG. 3d illustrates an example in which the lighting member 100 having a paper shape having a wider width is curved in a vertical direction and then applied. FIG. 3e illustrates a cross section of FIG. 3d (taken along line B-B'). As illustrated, the lighting member 100 using the light-guiding film according to the present invention is curved to have a curved surface at one side thereof in order to change an emergent direction of the light and enable the light to be emergent in various directions.

Figure 5A:
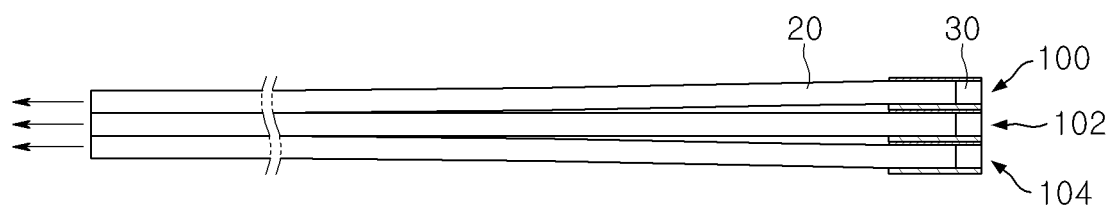
FIGS. 5a and 5b are views illustrating cases in which the lighting members using the light-guiding films are stacked and applied according to another exemplary embodiment of the present invention.
Figure 5B:
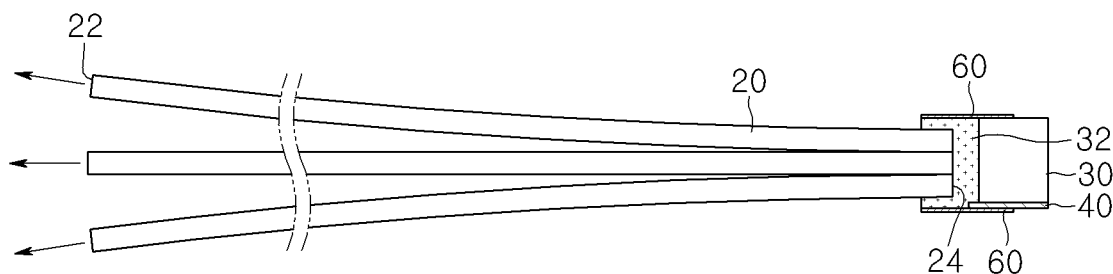
Figure 6A:
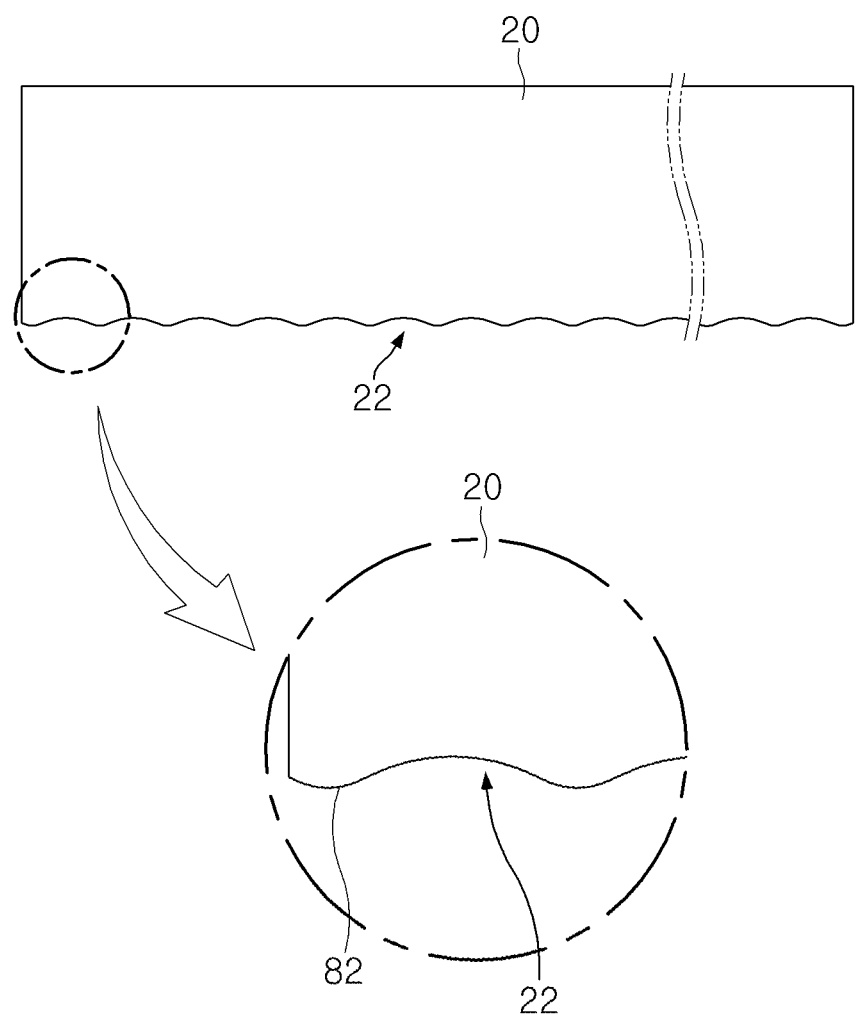
FIGS. 6a-6e illustrate the lighting members using the light-guiding films which have various patterns formed at light emergent parts according to another exemplary embodiment of the present invention.
Figure 6B:
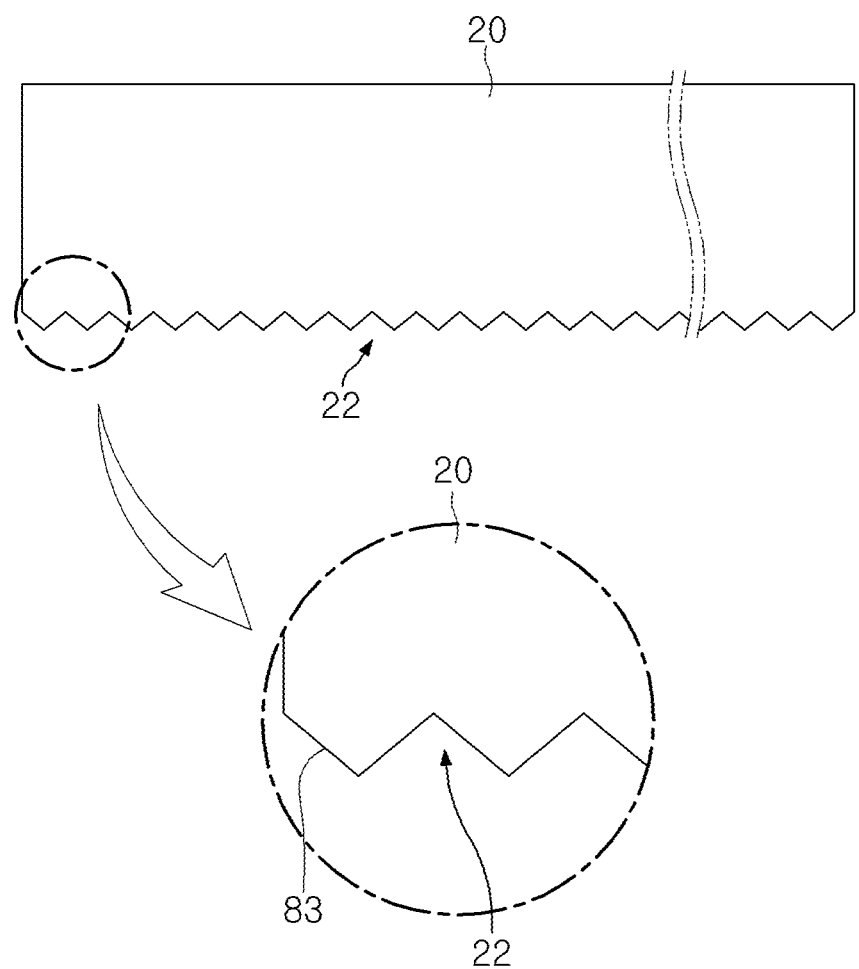
Figure 6C:
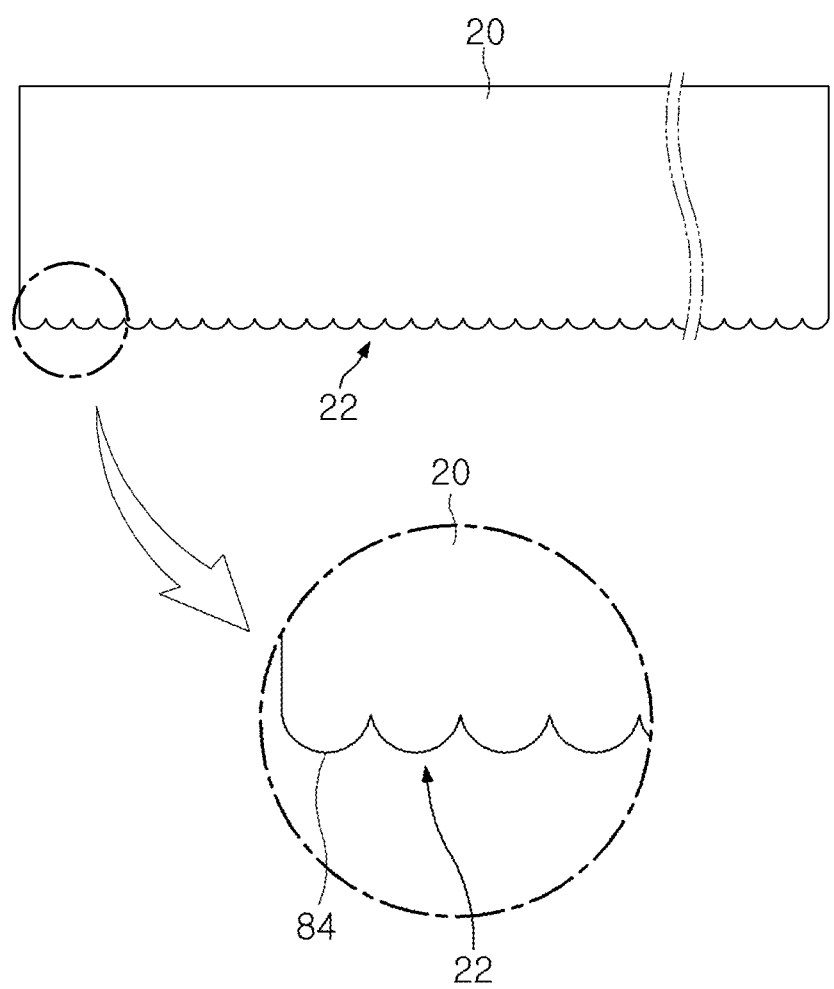
Figure 6D:
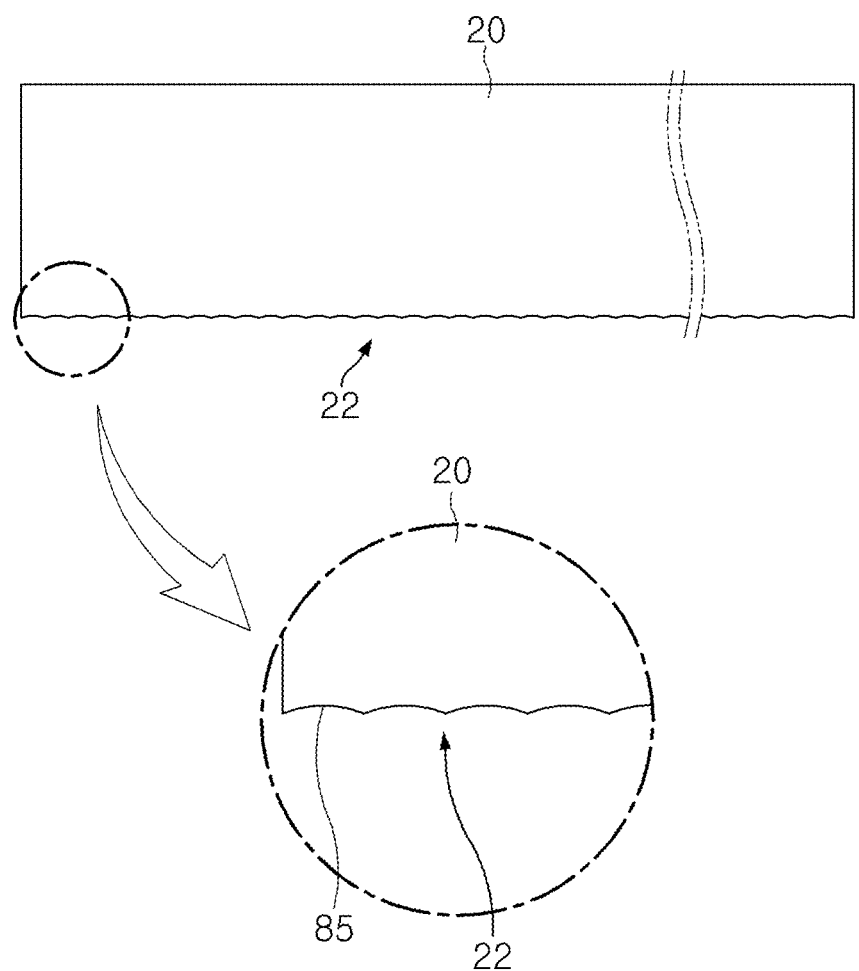
Figure 6E:
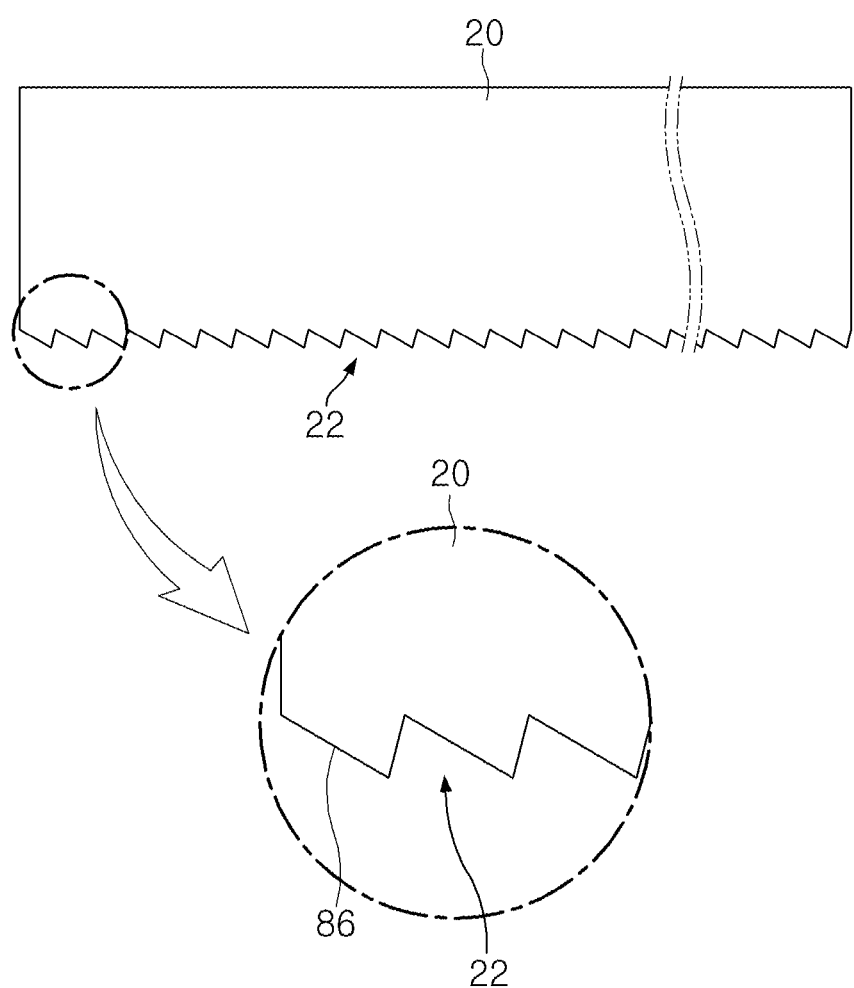

FIGS. 5a and 5b are views illustrating cases in which the lighting members using the light-guiding films are stacked and applied according to another exemplary embodiment of the present invention. In the example illustrated in FIG. 5a, the first lighting member 100 as described above, a second lighting member 102, and a third lighting member 104 are stacked. Since the respective light-guiding films 20 have flexibility, the light emergent parts of the respective lighting members 100, 102, and 104 may be disposed to be adjacent to one another even though the mount board 40 and the coupling layers 60 and 70 have thicknesses to some extent.

In the case in which the respective lighting members 100, 102, and 104 are stacked and then used as described above, it is possible to implement even the surface light source having a width to some extent while overcoming the limitation of the linear light source, and the respective unit lighting members 100, 102, and 104 may operate to release light in different colors. For example, the light-emitting diodes mounted on the unit lighting members 100, 102, and 104 may be configured to release red light, blue light, and green light, respectively. In this case, various presentations may be made as the light having different wavelengths is emitted in the form of multilayer lines. Alternatively, the respective unit lighting members 100, 102, and 104 may operate to provide different amounts of light and implement various visual effects even in a unit lighting member by changing color or brightness for each light-emitting diode. The lighting member according to the present invention has great significance in providing a basic component infrastructure that enables designers in vehicle manufacturer to implement various visual effects.

In addition, FIG. 5b illustrates a case in which the multiple light-guiding films 20 share the mount board 40 on which the multiple light-emitting diodes 30 are mounted. The multiple light-guiding films 20 are appropriately curved in accordance with a light source arrangement design of a structure on which the lighting member 100 according to the exemplary embodiment is to be mounted, such that the light emergent parts 22, which are the cut surfaces at the ends of the multiple light-guiding films 20, may be disposed to be adjacent to or spaced apart from one another and then used. Here, the light-emitting diode 30 disposed on the mount board 40 is coupled to the light incident parts 24 which are the different cut surfaces of the multiple light-guiding films 20 by a coupling portion 32 made of a light transmissive material such as silicone resin or epoxy resin, and the light is distributed to the respective light-guiding films 20 via the light transmissive coupling portion 32. The silicone resin may be used for high-output applications because the silicone resin is stronger against heat. As necessary, it is possible to further include a coupling layer 60, which is an appropriate member such as a tape having a bonding agent applied onto one or both of upper and lower surfaces thereof or other injection-molded resin products, so as to appropriately cover an upper surface of the light-emitting diode 30, a lower surface of the mount board 30, and the coupling portion 32. In the illustrated example, the coupling layers 60 are provided on both of the upper and lower surfaces. The coupling layer 60 may also perform a light blocking function that prevents the light released from the lighting light-emitting diode 30 from leaking to the outside.

FIGS. 6a-6e illustrate the lighting members using the light-guiding films 20 which have various patterns formed at the light emergent parts 22 according to another exemplary embodiment of the present invention. In the illustrated examples, the light emergent part 22 is formed with a wave-shaped curved surface 82 in FIG. 6a, a triangular cut surface 83 in FIG. 6b, a continuously formed convex surface 84 in FIG. 6c, a continuously formed concave surface 85 in FIG. 6d, or an asymmetric triangular cut surface 20 similar to a serrated shape in FIG. 6e. The pattern structure on the surface of the light emergent part 22 may be implemented during a process of cutting the light transmissive resin film or may be formed by a method such as polishing or laser cutting after the cutting process.

Figure 7A:
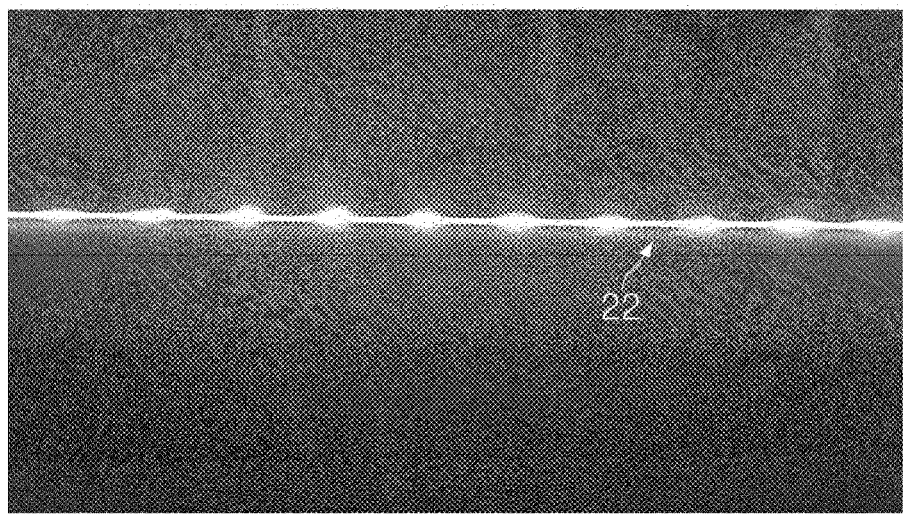
FIGS. 7a-7c are views for explaining changes in light emitting patterns in accordance with the patterns formed at the light emergent parts.
Figure 7B:
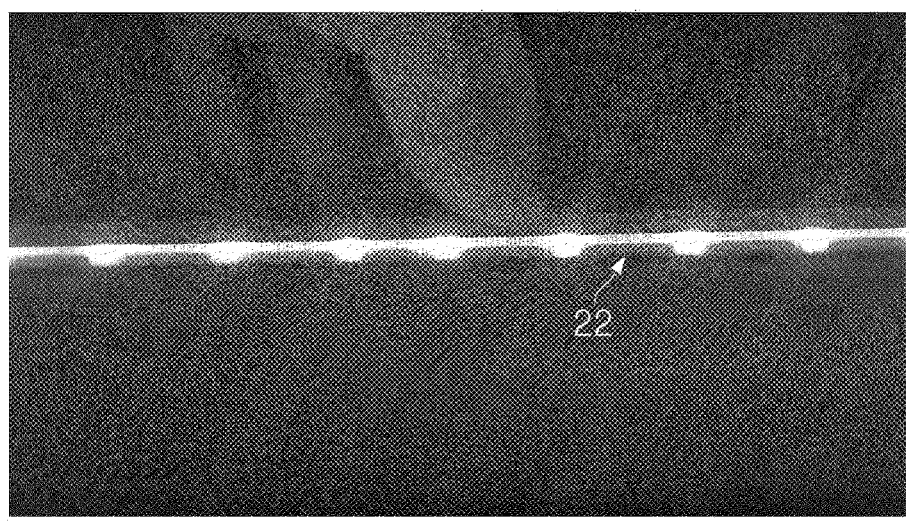
Figure 7C:
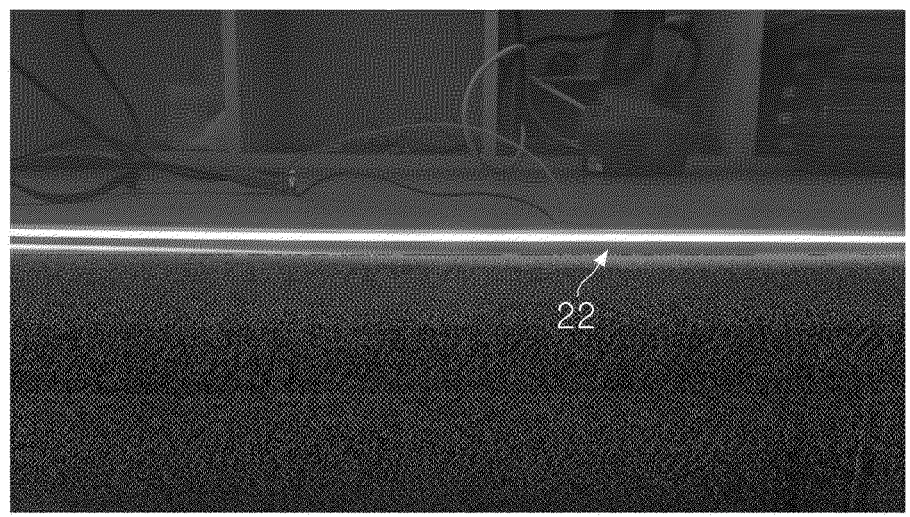

In particular, the present inventors have observed that it is possible to obtain innovative effects in implementing an ideal linear light source when the above-mentioned pattern is implemented on the light emergent part. FIGS. 7a-7c are views for explaining changes in light emitting patterns in accordance with the patterns formed at the light emergent parts.

Figure 2A:
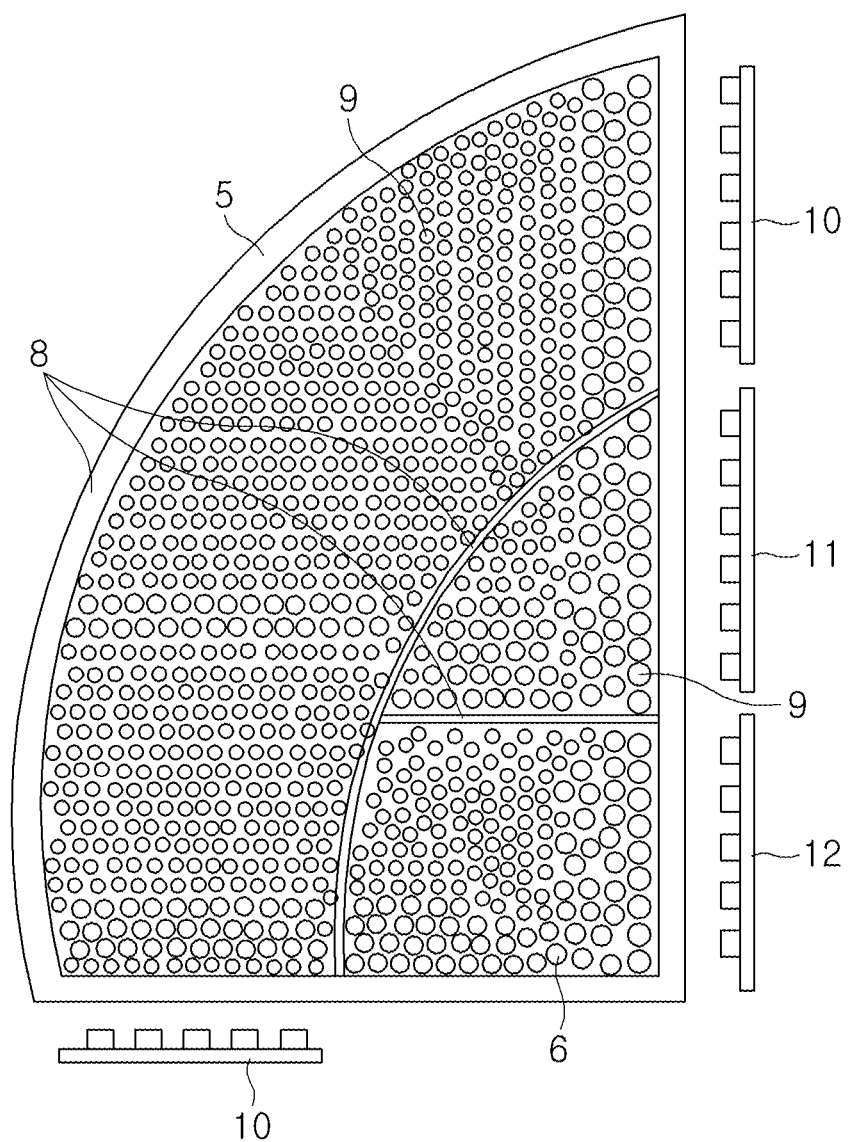
FIGS. 2a and 2b are views illustrating vertically light-emitting type lighting devices for vehicles which use plate-shaped light guide plates in the related art.
Figure 2B:
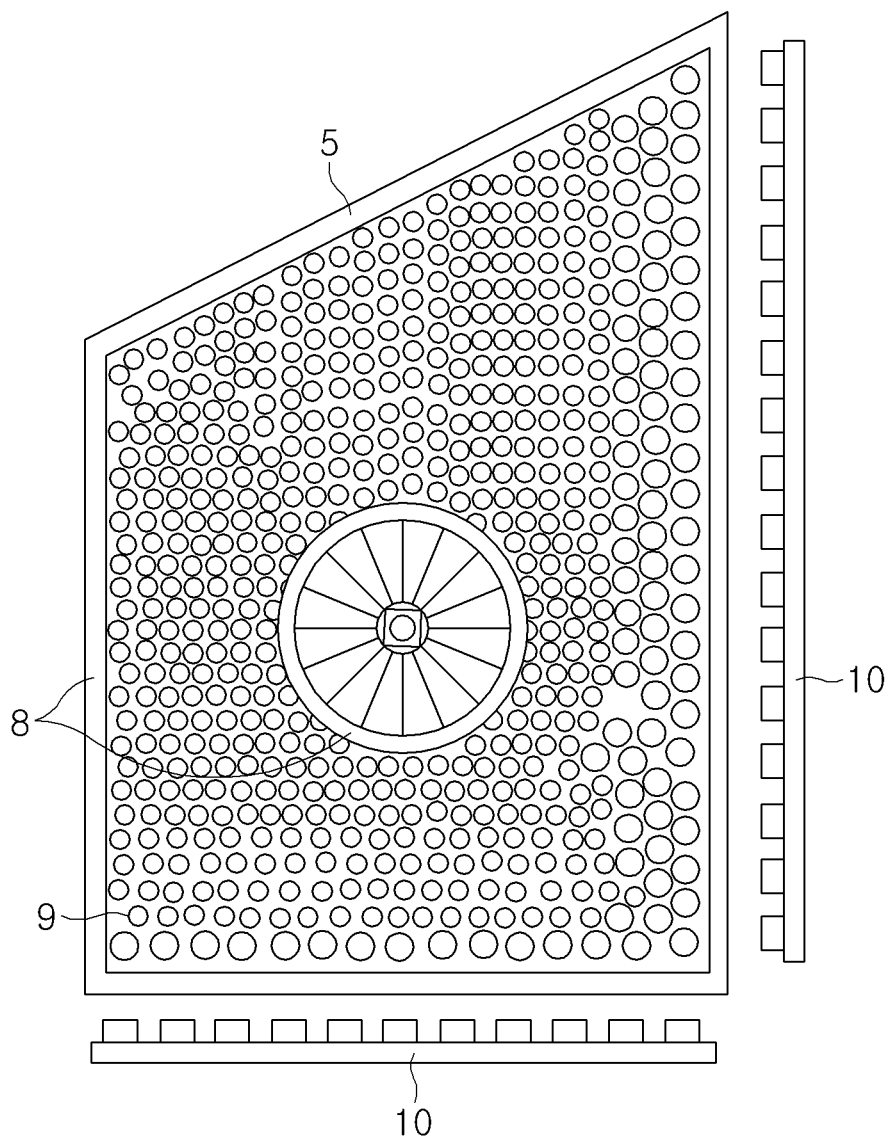

Unlike the related art (for example, see FIG. 2) in which a light incident part and a light emergent part are perpendicular to each other, in the lighting member 100 according to the exemplary embodiment illustrated in FIG. 3a, the light incident part 24 and the light emergent part 22 of the light-guiding film 20 face each other, such that the light, which is incident on the light incident part 24, is provided, with high light transmission efficiency, to the light emergent part 22. However, it is difficult to ensure a uniform light emitting pattern because this structure has a problem in that a light pattern made based on the arrangement of the light-emitting diodes 30 is reflected directly on the light emergent part if the arrangement intervals between the light-emitting diodes 30 are not narrow.

FIG. 7a is a photograph made by capturing a light emitting pattern observed at the light emergent part 22 in the case in which the multiple light-emitting diodes 30 are disposed to be spaced apart from one another and the light incident part 24 and the light emergent part 22 are configured to have a flat surface without pattern as illustrated in FIG. 3a. In this case, light emitting spots made based on the arrangement positions of the multiple light-emitting diodes 30 are reflected directly on the light emergent part 22, and as a result, uniformity of the light emitting pattern is not good. In this situation, to improve uniformity of the light emitting pattern, a separate component such as a light diffusion plate needs to be used or the number of light-emitting diodes needs to be increased so that the light-emitting diodes are more densely arranged, which causes an increase in component costs.

FIG. 7b is a photograph made by capturing a light emitting pattern observed at the light emergent part 22 in the case in which a pattern is formed at the light incident part 24 when the other structures as illustrated in FIG. 7a remain the same. Even in this case, like the case illustrated in FIG. 7a, light emitting spots made based on the arrangement positions of the multiple light-emitting diodes 30 are reflected directly on the light emergent part 22, and as a result, uniformity of the light emitting pattern is not good.

In contrast, FIG. 7c is a photograph made by capturing a light emitting pattern observed at the light emergent part 22 in the case in which a pattern is formed on the light emergent part 24 when the other structures as illustrated in FIG. 7a remain the same. In this case, as illustrated, the light emitting spots made based on the arrangement positions of the multiple light-emitting diodes 30 are rarely observed, and an ideal linear light source having an entirely and very uniform light emitting pattern may be implemented in a case in which the light-emitting diodes 30 are not densely arranged.

In the case of the exemplary embodiment in which the pattern is formed on the light emergent part 24 as described above, it is possible to obtain an effect of making a light emitting pattern uniform in a direction parallel to the light-guiding film 20 even though the light-guiding film 20 of the lighting member 100 has a thickness to some extent. Because this property is a property separate from flexibility of the light-guiding film 20, the light-guiding film 20 may not necessarily be obtained by the process of cutting the light transmissive resin film, and a sheet or board, which is formed by a method such as injection molding like the related art, may be applied.

In particular, a length from the light incident part 24 to the light emergent part 22 of the light-guiding film 20 is set to 8 mm to 250 mm, and as a result, it is possible to satisfy a technical standard (e.g., light amount, etc.) that needs to be satisfied by the lighting member, and it is possible to effectively implement uniformity of the light emitting pattern of the light-guiding film 20 in the case in which the lighting member to be provided in the vehicle is implemented by using the light-guiding film 20 according to the exemplary embodiment of the present invention. More specifically, in the lighting member according to the exemplary embodiment of the present invention, in a case in which a length of the light-guiding film 20 is set to 8 mm to 250 mm, it is possible to implement an ideal linear light source having an entirely and very uniform light emitting pattern at the light emergent part 22 of the light-guiding film 20.

MODE FOR INVENTION

Figure 8A:
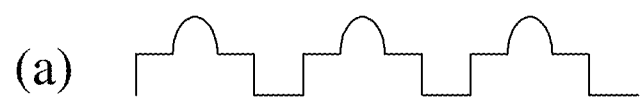
FIGS. 8a and 8b illustrate the light emergent parts of the light-guiding films having the multiple patterns which are repeatedly formed at predetermined intervals according to another exemplary embodiment of the present invention.
Figure 8A:
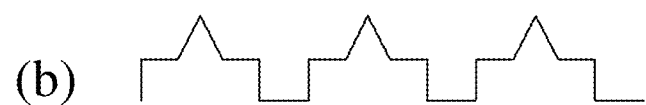
Figure 8A:
Figure 8B:
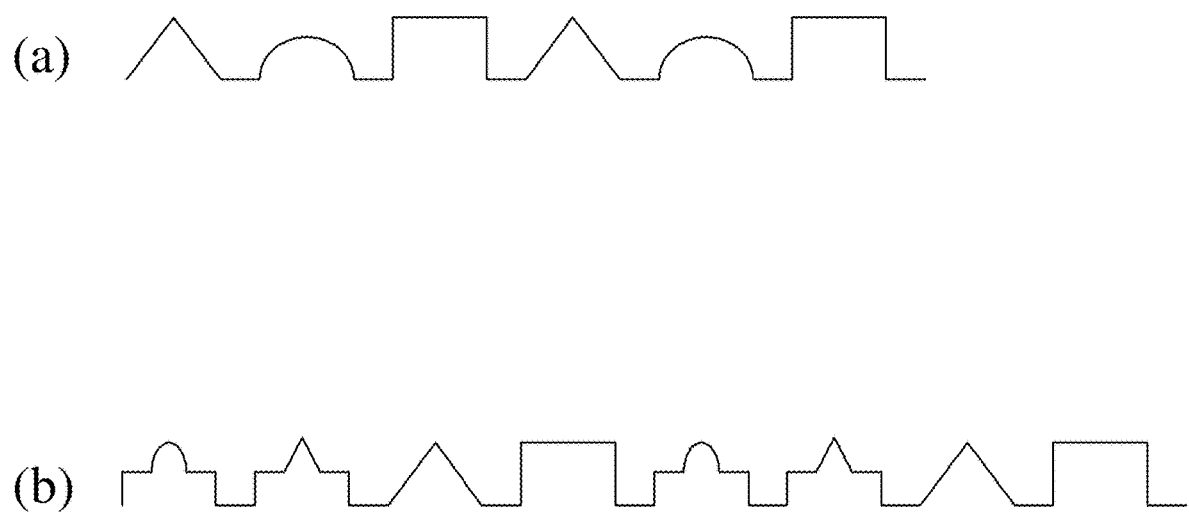

In addition, FIGS. 8a and 8b illustrate a shape of the light emergent part 22 of the light-guiding film 20 in which multiple patterns are repeatedly formed at predetermined intervals according to still another exemplary embodiment of the present invention.

The case in which non-uniformity of the light emitting pattern is mitigated by repeatedly forming one pattern has been described above with reference to FIGS. 6a-6e, but the present invention is not limited thereto, and various patterns may be employed in addition to the case.

More specifically, FIG. 8a illustrates (a) a case in which a pattern having a shape made by stacking a semicircle on a quadrangle is used, (b) a case in which a pattern having a shape made by stacking a triangle on a quadrangle is used, and (c) a case in which a pattern having a shape made by stacking a triangle on a semicircle is used.

Furthermore, FIG. 8b illustrates (a) a case in which a pattern having a shape made by sequentially arranging a triangle, a semicircle, and a quadrangle is used, and (b) a case in which a pattern having a shape made by stacking a semicircle on a quadrangle, a shape made by stacking a triangle on a quadrangle, and a shape made by sequentially arranging a triangle and a quadrangle is used.

As described above, it is possible to improve uniformity of the light emitting pattern described with reference to FIGS. 6a-6e by stacking the several shapes or repeatedly arranging the multiple shapes in a predetermined cycle as illustrated in FIGS. 8a and 8b. Furthermore, it is possible to form a predetermined lighting pattern by forming a point by increasing the light amount at a particular position or changing the light amount in accordance with the position. In particular, in the related art, to increase the light amount at a particular point or form a predetermined lighting pattern as described above, a separate lens needs to be provided, which may cause a complicated structure and an increase in manufacturing costs. However, in the present invention, it is possible to effectively implement various lighting patterns without a separate lens.

Figure 9A:
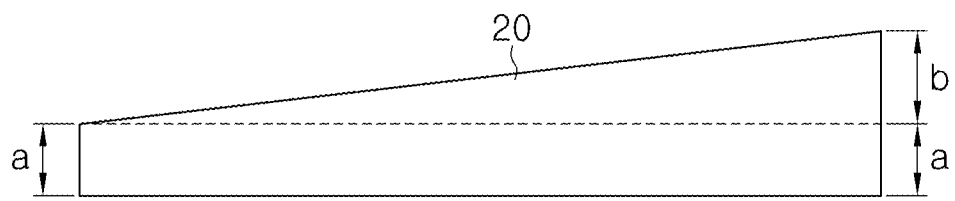
FIGS. 9a-9c illustrate the light-guiding films having tapered cross sections and the lighting members using the light-guiding films according to another exemplary embodiment of the present invention.
Figure 9B:
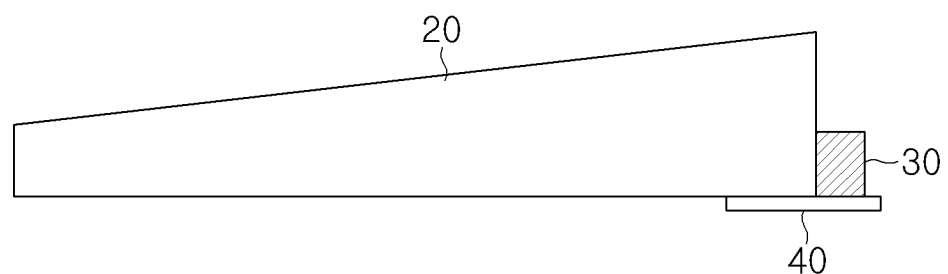
Figure 9C:
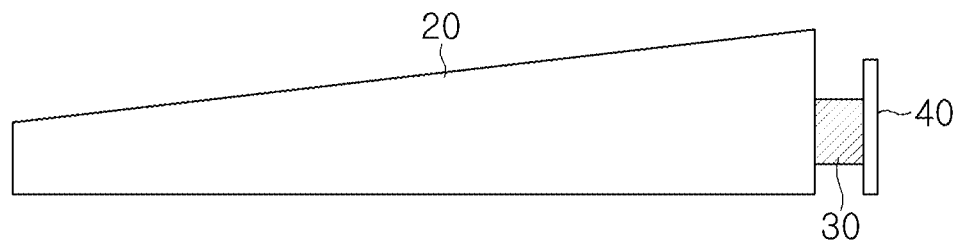

In addition, FIGS. 9a-9c illustrate the light-guiding films 20 having tapered cross sections and the lighting members using the light-guiding films 20 according to yet another exemplary embodiment of the present invention.

The light-guiding film 20 having a uniform thickness (for example, see FIG. 3b that illustrates a cross section of FIG. 3a taken along line A-A') has been mainly described above as the exemplary embodiment of the present invention, but the present invention is not necessarily limited thereto, and the light-guiding film 20 according to the exemplary embodiment of the present invention may have a tapered cross section as illustrated in FIG. 9a.

More specifically, FIG. 9a illustrates that one side of the light-guiding film 20 has a small thickness a (e.g., 0.3 mm≤a≤3 mm), but the other side of the light-guiding film 20 may have a tapered cross section having a larger thickness a+b (e.g., 0.3 mm<a+b≤10 mm).

In particular, if the thickness of the light-guiding film 20 having the uniform thickness cannot reach at least 3 to 4 mm, it is difficult to manufacture the light-guiding film 20 through the injection molding process. However, in the case in which the light-guiding film 20 according to the exemplary embodiment of the present invention has the tapered cross section, it is possible to manufacture the light-guiding film 20 by using the injection molding process in the case in which the other side of the light-guiding film 20 has the large thickness a+b of 3 to 4 mm or more even though the thickness a of one side of the light-guiding film 20 cannot reach 3 to 4 mm.

Therefore, in the exemplary embodiment of the present invention, it is possible to manufacture the light-guiding film 20 having the tapered cross section by applying the injection molding process and using an appropriate material such as acrylic-based resin (PMMA) or polycarbonate (PC).

In addition, FIGS. 9b and 9c illustrate the lighting member using the light-guiding film 20 having the tapered cross section according to the exemplary embodiment of the present invention.

As described above with reference to FIG. 3, the light-emitting diode 30, which may be employed in accordance with the thickness of the light-guiding film 20, may be limited in the case in which the light-guiding film 20 having the uniform thickness is used (e.g., a side-view light-emitting diode (LEDs) is used to allow the light-guiding film 20 to have a thickness of 3 mm). In contrast, in the case in which the light-guiding film 20 having the tapered cross section according to the exemplary embodiment of the present invention is used, the side-view light-emitting diode LED may be used as illustrated in FIG. 9b, and a top-view light-emitting diode (LED) may be easily employed as illustrated in FIG. 9c. Therefore, it is possible to obtain more excellent heat radiating properties and light amount properties and to select the more inexpensive light-emitting diode 30, such that it is possible to more effectively improve a performance of the lighting member.

In addition, although not illustrated in FIGS. 9b and 9c, the coupling layer 60 for fixing the light-emitting diode 30, the mount board 40, and the light-guiding film 20 may be provided or a coupling member (not illustrated) having an appropriate structure may be provided.

Figure 10A:
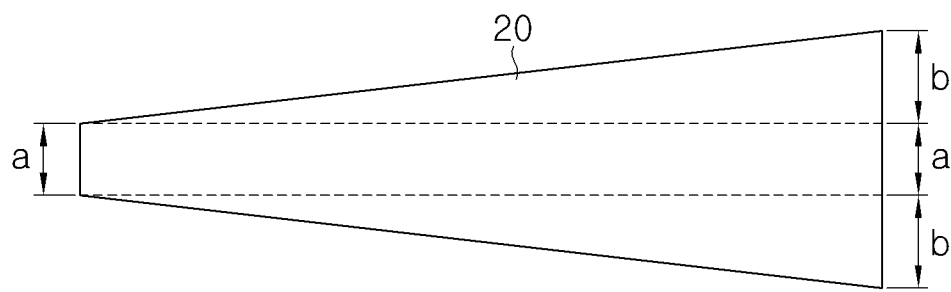
FIGS. 10a-10c illustrate the light-guiding films having various tapered cross sections according to another exemplary embodiment of the present invention.
Figure 10B:
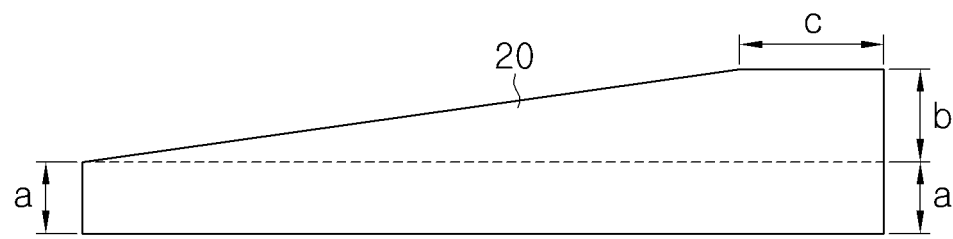
Figure 10C:
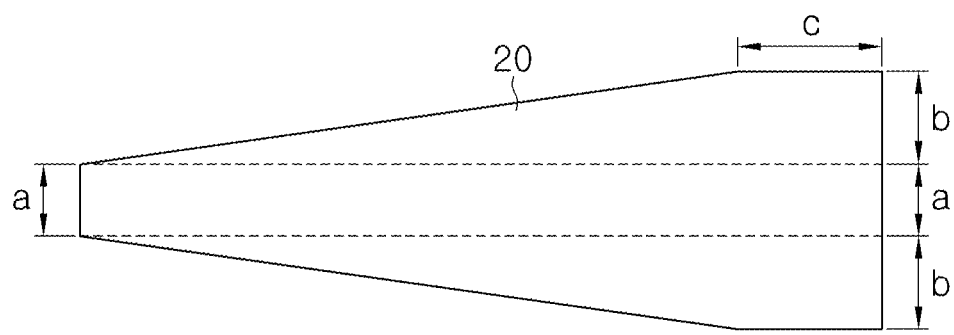

Furthermore, the light-guiding film 20 according to the exemplary embodiment of the present invention may have more various tapered cross sections. FIGS. 10a-10c illustrate the light-guiding films 20 having various tapered cross sections according to another exemplary embodiment of the present invention.

First, an upper surface of the light-guiding film 20 may have a tapered shape as illustrated in FIG. 9a, or both of the upper and lower surfaces of the light-guiding film 20 may have tapered shapes as illustrated in FIG. 10a. Furthermore, as illustrated in FIGS. 10b and 10c, the light-guiding film 20 may include a section having a uniform thickness (section c in FIGS. 10b and 10c) in addition to the section having the tapered shape.

As described above, the light-guiding film 20 according to the exemplary embodiment of the present invention may have various tapered cross sections, and as a result, it is possible to implement the lighting member with the further improved structure and properties, and the light-guiding film 20 may be manufactured even by the injection molding process.

Figure 11A:
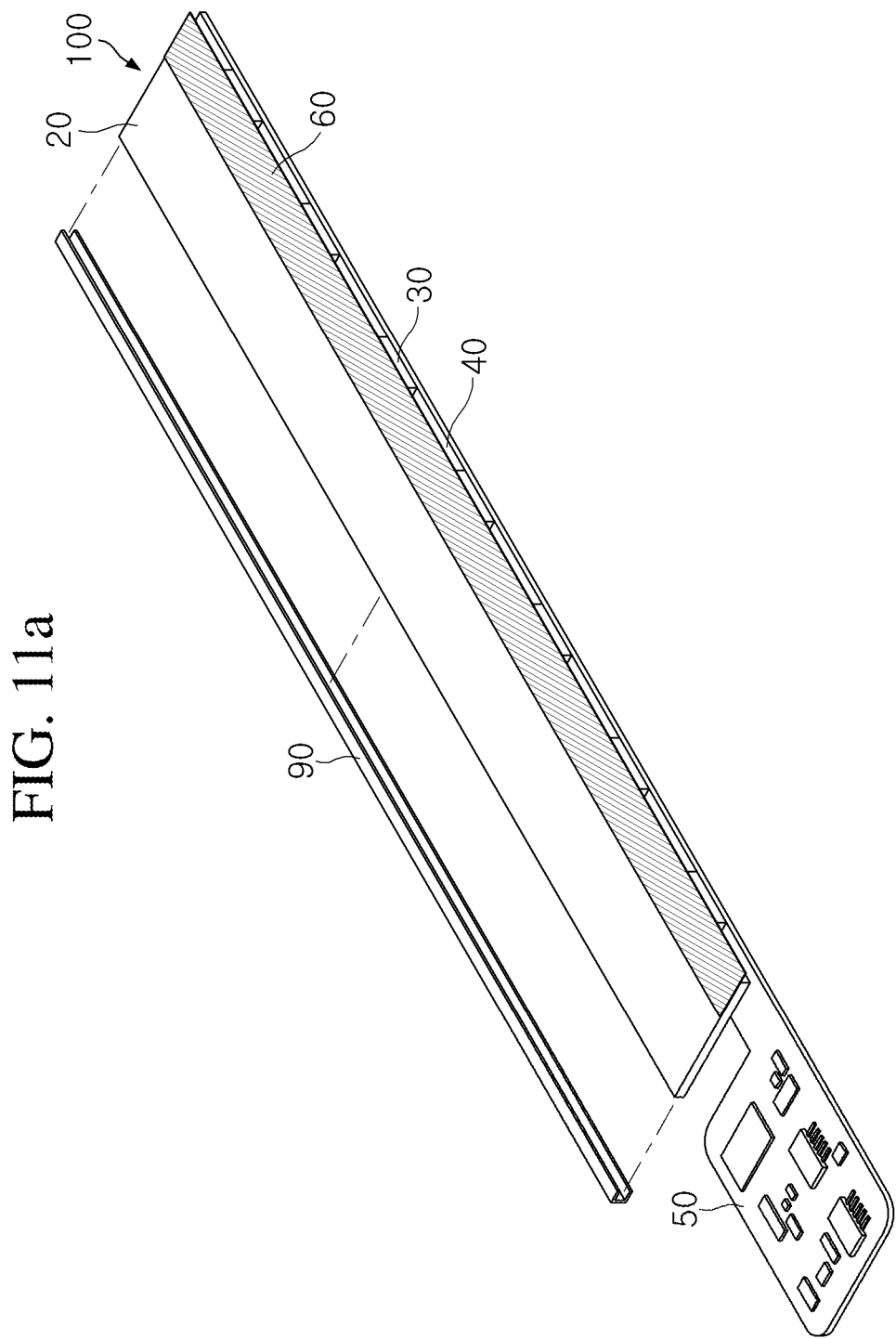
FIGS. 11a-11c illustrate the lighting members using the light-guiding films in which cover members are coupled to the light emergent parts according to another exemplary embodiment of the present invention.
Figure 11B:
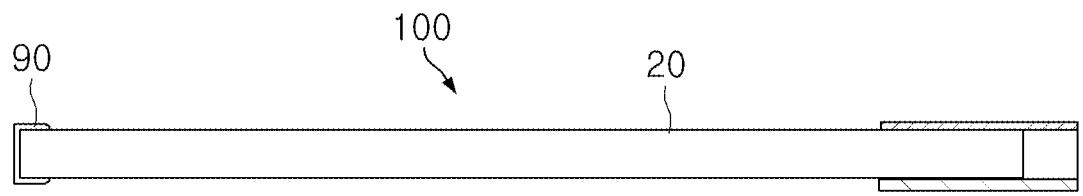
Figure 11C:
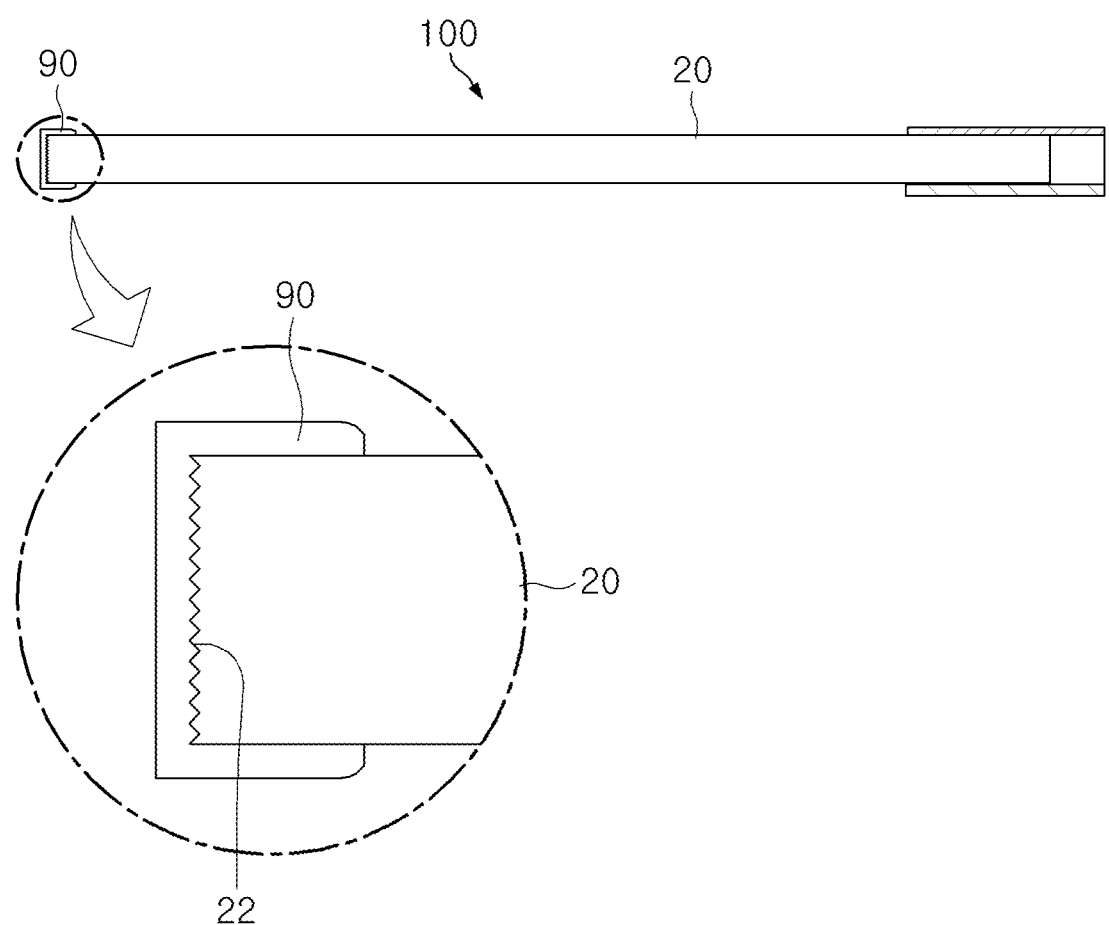

Furthermore, FIGS. 11a-11c illustrate the lighting member 100 using the light-guiding film 20 in which a cover member 90 is coupled to the light emergent part 22 according to yet another exemplary embodiment of the present invention. In addition, FIGS. 12a-12c illustrate the various cover members 90 that may be coupled to the light emergent part as necessary.

An insertion groove 92 may be formed in the cover member 90 so as to surround the light emergent part 22 of the light-guiding film 20, and the cover member 90 is made of a light transmissive transparent or semi-transparent material. Various patterns may also be formed on the cover member 90. For example, in FIG. 11c, concave-convex portions are formed in a vertical direction on the light emergent part 22 of the light-guiding film 20, and debossed concave-convex portions, which match with the concave-convex portions on the light emergent part 22, are formed inside the cover member 90. In this case, the concave-convex structures formed on the light emergent part 22 may act as a light scattering pattern, thereby contributing to the improvement of uniformity of the light emitting pattern.

Figure 12A:
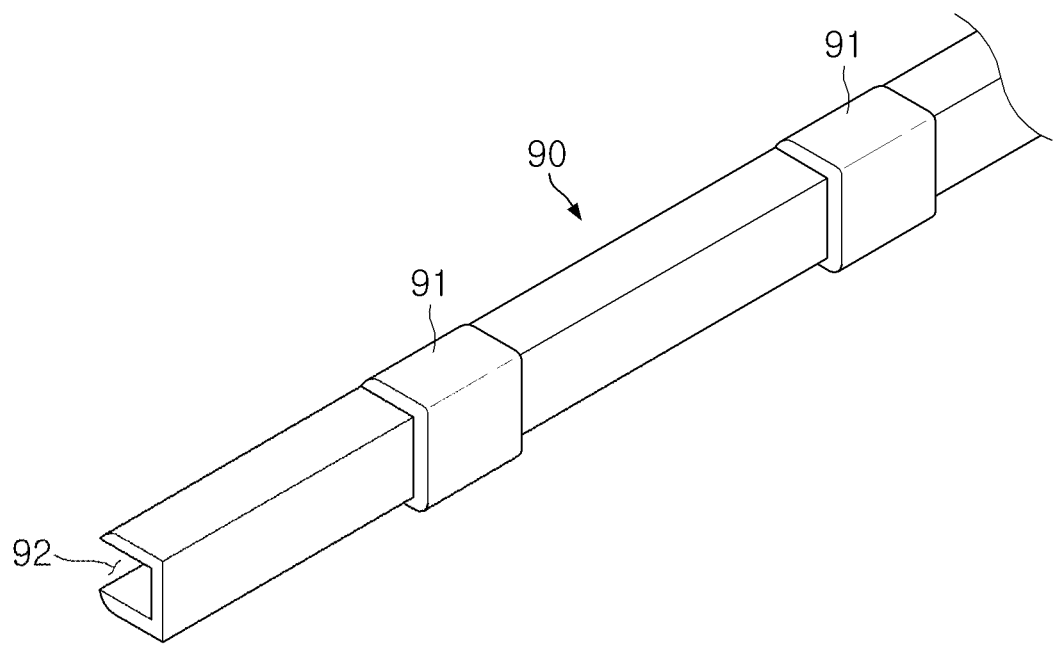
FIGS. 12a-12c illustrate the cover members coupled to the light emergent parts.

In addition, FIG. 12a illustrates an example in which patterns 91, which are structured to protrude from an outer surface of the cover member 90, are formed as necessary at predetermined intervals. Because the amount of light being released to the outside through the cover member 90 is changed at corresponding portions, visibility at the particular portion may be improved, such that a visual emphasis point may be formed.

Figure 12B:
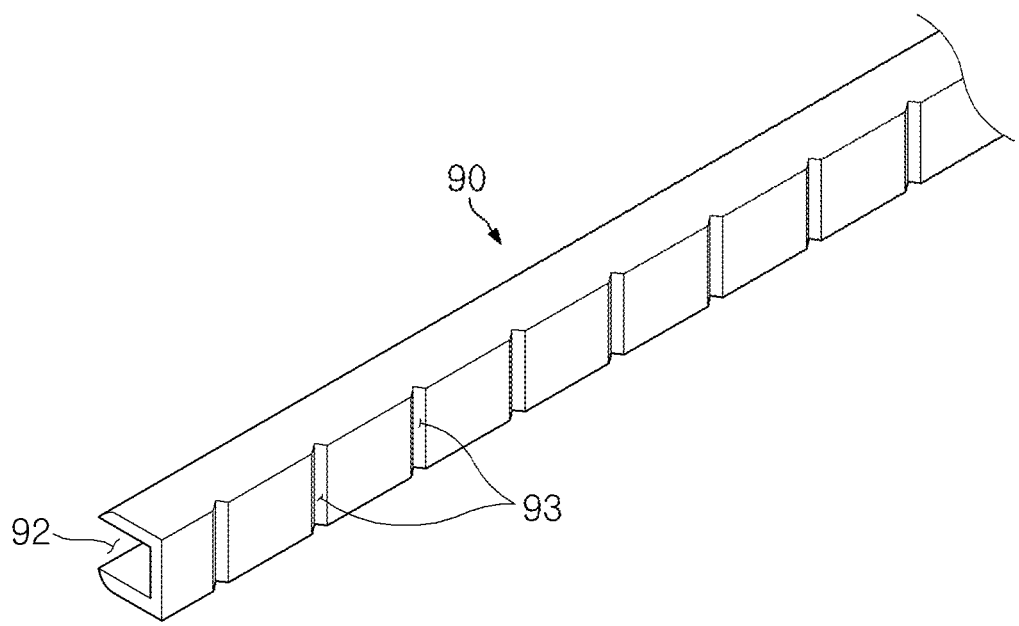
Figure 12C:
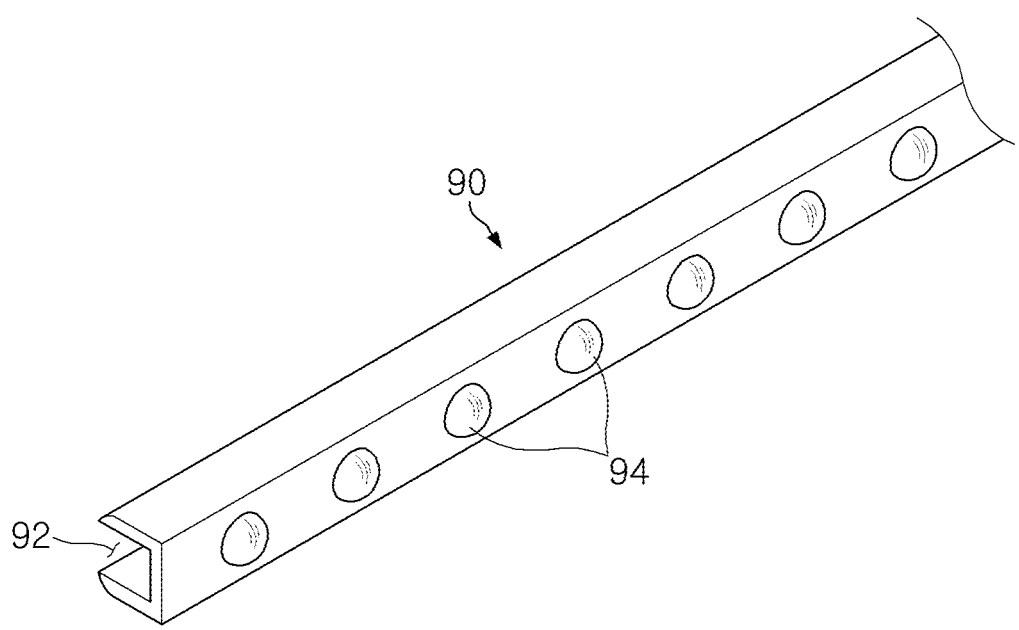

In addition, FIG. 12b illustrates an example in which notch patterns 93 are formed at predetermined intervals in an outer surface of the cover member 90 as necessary, and the notch pattern is structured to be partially cut out inward from the outer surface of the cover member 90. For example, the notch pattern may be formed in the form of a triangular groove as illustrated. In this case, the light is refracted at an inclined surface, such that visibility at the particular portion of the cover member 90 may be improved, and a visual emphasis point may be formed.

In addition, FIG. 12c illustrates an example in which lens patterns 94 are formed at predetermined intervals so as to concentratedly release the light to the outer surface of the cover member 90 as necessary, and the lens pattern 94 is formed in the form of a convex lens that convexly protrudes from the outer surface of the cover member 90.

In addition, various visual expressions may be implemented by utilizing the surface of the cover member 90.

Figure 13:
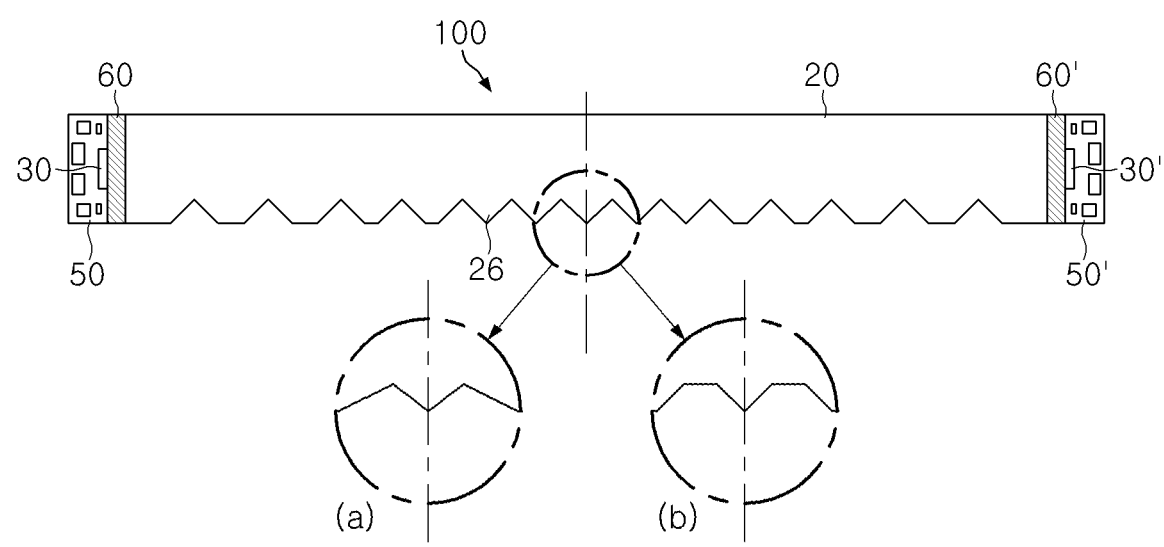
FIGS. 13 and 14 illustrate a lighting member using a light-guiding film which has one cut-out end thereof utilized as a light reflective part according to yet another exemplary embodiment of the present invention.
Figure 14:
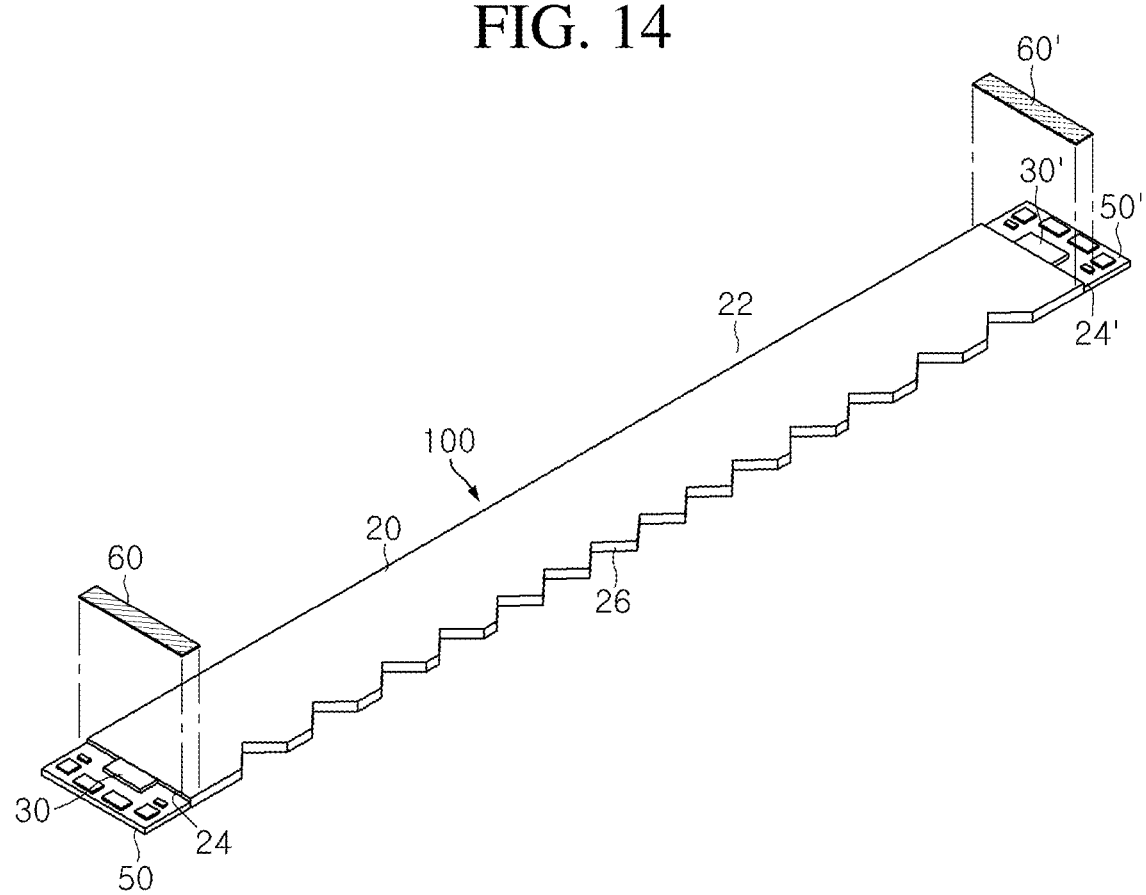

FIGS. 13 and 14 illustrate the lighting member 100 using the light-guiding film which has one cut-out end utilized as a light reflective part according to yet another exemplary embodiment of the present invention. The lighting member 100 according to the exemplary embodiment also has the light-guiding film 20 that has the shape defined by the multiple cut surfaces or edges formed by being cut and separated from the light transmissive resin film. At least one of the multiple cut surfaces is used as the light emergent part 22, and at least another one of the multiple cut surfaces is used as the light incident part 24.

In the present exemplary embodiment, at least still another one of the multiple cut surfaces is additionally utilized as a light reflective part 26, and the light reflective part 26 is formed with a concave-convex reflective pattern serving to totally reflect the light, which is incident through the light-emitting diodes 30 from the light incident parts 24 at both sides of the light-guiding film 20, and guide the light to the light emergent part 22. In this structure, there is an advantage in that it is possible to implement the linear light source having the uniform light emitting pattern through the entire light emergent part 22 even though the number of light-emitting diodes 30 is reduced and only one or more light-emitting diodes 30 are disposed.

The shape of the concave-convex portions, which constitute the reflective pattern of the light reflective part 26 illustrated in FIG. 13, may be variously changed as illustrated in (a) and (b). However, the amount of reflective light is insufficient at a position distant from the light-emitting diode 30, and the amount of light shown at the light emergent part 22 is small, such that the light emitting pattern may not be uniform. To compensate for the non-uniformity of the light emitting pattern, the density of the concave-convex portions, which constitute the reflective pattern, may be highest at a central portion of the light-guiding film 20, and the density may be decreased from a centerline toward the light source.

Here, the one or more light-emitting diodes 30 are disposed on the mount board, and the mount board may be initially connected to the driving module 50 by being integrated with the driving module 50 for electrically operating the light-emitting diodes 30 or the mount board and the driving module 50 may be separately implemented and then coupled and connected to each other.

The exemplary embodiments described in the present specification and the drawings are just illustrative but not intended to limit the scope of the present invention in any manner. In addition, line connections or connecting members between constituent elements illustrated in the drawings illustratively indicate functional connections, physical connections, and/or connections between circuits and may be represented as replaceable or additional and various functional connections, physical connections, and/or connections between circuits in an actual apparatus. In addition, a constituent element, which is not specifically mentioned together with the term such as "essentially" or "importantly", may not be a constituent element required to be necessarily applied to the present invention.

The term "the" and indicative terms similar thereto used in the specification (particularly, claims) of the present invention may be used for both singular expressions and plural expressions. In addition, in a case in which a range is disclosed in the present invention, individual values falling into the range are applied to the present invention (unless disclosed to the contrary), and the range is identical to the individual values described in the detailed description of the invention. In addition, the steps, which constitute the method, in the present invention, are not intended to necessarily limit the order of the sequence, the order may be appropriately changed as necessary as long as any one step need not be performed necessarily prior to the other steps because of the nature of each process. All examples or illustrative terms such as "the like", "etc." used in the present invention are merely used to explain the present invention in detail, but the scope of the present invention is not limited by the examples or the illustrative terms as long as the examples or the illustrative terms are not disclosed in the claims. In addition, it can be understood by those skilled in the art that the present invention may be configured based on the claims to which various modifications, combinations, and alterations are added or based on design conditions and elements within the scope equivalent to the scope of the claims.

What is claimed is:

1. A lighting member using a light-guiding film, the lighting member comprising:
   the light-guiding film which has a shape defined by multiple cut surfaces formed by being cut and separated from a flexible light transmissive resin film, the light-guiding film having a light incident part that is at least one of the multiple cut surfaces, and a light emergent part that is at least another one of the multiple cut surfaces and faces the light incident part, and at least a part of light incident on the light incident part being emergent from the light emergent part;
   multiple light-emitting diodes which are arranged at predetermined intervals in the vicinity of the light incident part so as to allow light to be incident on the light incident part;
   a mount board which is connected to the light-guiding film and has a surface on which the multiple light-emitting diodes are disposed; and
   a driving module which is connected to the mount board to electrically operate the multiple light-emitting diodes.

2. The lighting member of claim 1, wherein the light-guiding film has a thickness of 0.1 mm to 2.0 mm.

3. The lighting member of claim 2, wherein a length from the light incident part to the light emergent part of the light-guiding film is 8 mm to 250 mm.

4. The lighting member of claim 1, wherein the light incident part faces the multiple light-emitting diodes, and the light emergent part is positioned at a side opposite to a side that constitutes the light incident part on the plane of the light-guiding film.

5. The lighting member of claim 1, wherein the light-guiding film is cut to have a band shape.

6. The lighting member of claim 1, wherein at least any one of the light emergent part and the light incident part is cut to constitute a curved side on the plane of the light-guiding film.

7. The lighting member of claim 1, wherein concave-convex portions are formed on a surface of the light emergent part to mitigate non-uniformity of a light emitting pattern on the light emergent part which is caused as the multiple light-emitting diodes are disposed to be spaced apart from one another.

8. The lighting member of claim 7, wherein concave-convex portions having one or two or more shapes are repeatedly disposed at predetermined intervals on a surface of the light emergent part.

9. The lighting member of claim 1, further comprising: one or more coupling layers attached to one or both of upper and lower surfaces of the light-guiding film.

10. A lighting member using a light-guiding film, the lighting member comprising:
    the light-guiding film which has a light incident part that is at least one of multiple side surfaces, and a light emergent part that is at least another one of the multiple side surfaces and faces the light incident part, at least a part of light incident on the light incident part being released from the light emergent part;
    multiple light-emitting diodes which are arranged at predetermined intervals in the vicinity of the light incident part so as to allow light to be incident on the light incident part;
    a mount board which is connected to the light-guiding film and has a surface on which the multiple light-emitting diodes are disposed; and
    a driving module which is connected to the mount board to electrically operate the multiple light-emitting diodes,
    wherein concave-convex portions are formed on a surface of the light emergent part to mitigate non-uniformity of a light emitting pattern on the light emergent part in a direction parallel to the light-guiding film which is caused as the multiple light-emitting diodes are disposed to be spaced apart from one another.

11. The lighting member of claim 10, wherein the light-guiding film has a thickness of 0.1 mm to 2.0 mm.

12. The lighting member of claim 11, wherein a length from the light incident part to the light emergent part of the light-guiding film is 8 mm to 250 mm.

13. The lighting member of claim 10, wherein the light incident part faces the multiple light-emitting diodes, and the light emergent part is positioned at a side opposite to a side that constitutes the light incident part on the plane of the light-guiding film.

14. The lighting member of claim 10, wherein the light-guiding film is cut to have a band shape.

15. The lighting member of claim 10, wherein at least any one of the light emergent part and the light incident part is cut to constitute a curved side on the plane of the light-guiding film.

16. The lighting member of claim 10, further comprising: one or more coupling layers attached to one or both of upper and lower surfaces of the light-guiding film.

17. The lighting member of claim 10, wherein concave-convex portions having one or two or more shapes are repeatedly disposed at predetermined intervals on a surface of the light emergent part.

18. The lighting member of claim 10, wherein a thickness of the light-guiding film at the light emergent part and a thickness of the light-guiding film at the light incident part are different from each other.

19. The lighting member of claim 18, wherein a cross section of the light-guiding film includes a tapered shape such that the thickness at the light emergent part is larger than the thickness at the light incident part.

20. A lighting member using a light-guiding film, the lighting member comprising:
    the light-guiding film which has a shape defined by multiple cut surfaces formed by being cut and separated from a flexible light transmissive resin film, the light-guiding film having a light incident part that is at least one of the multiple cut surfaces, a light reflective part that is at least another one of the multiple cut surfaces and reflects light incident from the light incident part, and a light emergent part that is at least still another one of the multiple cut surfaces and faces the light incident part, at least a part of light incident on the light incident part and at least a part of light reflected from the light reflective part being released from the light emergent part;
    one or more light-emitting diodes which are disposed at predetermined positions in the vicinity of the light incident part so as to allow light to be incident on the light incident part;

a mount board which is connected to the light-guiding film and has a surface on which the one or more light-emitting diodes are disposed; and a driving module which is connected to the mount board to electrically operate the one or more light-emitting diodes.

21. A method of manufacturing a lighting member using a light-guiding film, the method comprising:

forming the light-guiding film which has a shape defined by multiple cut surfaces formed by being cut and separated from a flexible light transmissive resin film, the light-guiding film having a light incident part that is at least one of the multiple cut surfaces, and a light emergent part that is at least another one of the multiple cut surfaces and faces the light incident part, and at least a part of light incident on the light incident part being emergent from the light emergent part;

aligning multiple light-emitting diodes at predetermined intervals on a mount board in the vicinity of the light incident part so as to allow light to be incident on the light incident part; and coupling the light-guiding film to the mount board which has a surface on which the multiple light-emitting diodes are disposed and to the driving module which electrically operates the multiple light-emitting diodes.

22. A method of manufacturing a lighting member using a light-guiding film, the method comprising:

forming the light-guiding film which has a light incident part that is at least one of multiple side surfaces, and a light emergent part that is at least another one of the multiple side surfaces and faces the light incident part, at least a part of light incident on the light incident part being released from the light emergent part;

aligning multiple light-emitting diodes at predetermined intervals on a mount board in the vicinity of the light incident part so as to allow light to be incident on the light incident part; and coupling the light-guiding film to the mount board which has a surface on which the multiple light-emitting diodes are disposed and to the driving module which electrically operates the multiple light-emitting diodes, wherein concave-convex portions are formed on a surface of the light emergent part to mitigate non-uniformity of a light emitting pattern on the light emergent part in a direction parallel to the light-guiding film which is caused as the multiple light-emitting diodes are disposed to be spaced apart from one another.

23. A method of manufacturing a lighting member using a light-guiding film, the method comprising:

forming the light-guiding film which has a shape defined by multiple cut surfaces formed by being cut and separated from a flexible light transmissive resin film, the light-guiding film having a light incident part that is at least one of the multiple cut surfaces, a light reflective part that is at least another one of the multiple cut surfaces and reflects light incident from the light incident part, and a light emergent part that is at least still another one of the multiple cut surfaces and faces the light incident part, at least a part of light incident on the light incident part and at least a part of light reflected from the light reflective part being released from the light emergent part;

disposing one or more light-emitting diodes at predetermined positions in the vicinity of the light incident part so as to allow light to be incident on the light incident part; and coupling the light-guiding film to the mount board which has a surface on which the one or more light-emitting diodes are disposed and to a driving module which electrically operates the one or more light-emitting diodes.

* * * * *